US012623615B2

(12) United States Patent
Chang et al.

(10) Patent No.: US 12,623,615 B2
(45) Date of Patent: May 12, 2026

(54) VEHICLE ROOF AND VEHICLE

(71) Applicants: ZHEJIANG ZEEKR INTELLIGENT TECHNOLOGY CO., LTD., Ningbo (CN); ZHEJIANG GEELY HOLDING GROUP CO., LTD., Hangzhou (CN)

(72) Inventors: Zhihao Chang, Ningbo (CN); Yun Xu, Ningbo (CN); Guolin Li, Ningbo (CN); Hongqiang Chen, Ningbo (CN); Lianlei Li, Ningbo (CN); Deli Liu, Ningbo (CN)

(73) Assignees: ZHEJIANG ZEEKR INTELLIGENT TECHNOLOGY CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 19/020,683

(22) Filed: Jan. 14, 2025

(65) Prior Publication Data

US 2025/0153673 A1 May 15, 2025

Related U.S. Application Data

(63) Continuation of application No. PCT/CN2024/088511, filed on Apr. 18, 2024.

(30) Foreign Application Priority Data

Apr. 21, 2023 (CN) .......................... 202310452482.3
Apr. 21, 2023 (CN) .......................... 202310452487.6
Apr. 21, 2023 (CN) .......................... 202310455015.6

(51) Int. Cl.
*B60R 13/02* (2006.01)
*B60R 21/213* (2011.01)
(Continued)

(52) U.S. Cl.
CPC ........ *B60R 13/0231* (2013.01); *B60R 21/213* (2013.01); *B60R 21/2165* (2013.01); *B60R 21/262* (2013.01); *B62D 25/06* (2013.01)

(58) Field of Classification Search
CPC .................................................. B60R 13/0231
See application file for complete search history.

(56) References Cited

U.S. PATENT DOCUMENTS 6,070,902 A * 6/2000 Kowalski ............ B60R 13/0225
280/730.2
6,913,280 B2 * 7/2005 Dominissini ......... B60R 21/213
296/214

(Continued)

FOREIGN PATENT DOCUMENTS

CN 202806613 U 3/2013
CN 106043154 A 10/2016

(Continued)

OTHER PUBLICATIONS

International Search Report and Written Opinion issued in corresponding PCT Application No. PCT/CN2024/088511, dated Jun. 10, 2024.

(Continued)

*Primary Examiner* — Nicole T Verley
(74) *Attorney, Agent, or Firm* — Westbridge IP LLC

(57) ABSTRACT

Disclosed are a vehicle ceiling and a vehicle. The vehicle ceiling includes a top metal plate, a roof panel assembly, and a dual lock. An inflatable curtain and an air curtain generator are provided close to one side of the top metal plate, and the air curtain generator is configured to generate gas to fill the inflatable curtain; the roof panel assembly relatively fixed to the top metal plate, a first blasting line is provided in an area of the roof panel assembly corresponding to an installation position of the inflatable curtain; a plurality of dual locks are (Continued)

1300  1310          1330    1150 provided between the top metal plate and the roof panel assembly along the first blasting line.

19 Claims, 16 Drawing Sheets

(51) Int. Cl.
    *B60R 21/2165*     (2011.01)
    *B60R 21/262*     (2011.01)
    *B62D 25/06*     (2006.01)

(56) References Cited

U.S. PATENT DOCUMENTS

| | | | | |
|---|---|---|---|---|
| 7,909,357 B2 * | 3/2011 | Iida | ........................ | B60R 21/233 |
| | | | | 280/730.2 |
| 2005/0057078 A1 * | 3/2005 | Huijer | ................. | B60R 13/0231 |
| | | | | 296/214 |
| 2009/0085330 A1 * | 4/2009 | Ilda | ........................ | B60R 21/232 |
| | | | | 280/728.2 |
| 2017/0291568 A1 | 10/2017 | Shen et al. | | |

FOREIGN PATENT DOCUMENTS

| | | | | | |
|---|---|---|---|---|---|
| CN | 215663331 | U | | 1/2022 | |
| CN | 115139965 | A | | 10/2022 | |
| DE | 102005045923 | A1 * | 5/2006 | ........... | B60R 21/232 |
| DE | 202021101051 | U1 * | 3/2021 | ........... | B60R 21/214 |
| FR | 3016844 | B1 * | 5/2017 | | |
| JP | 2007002938 | A | | 1/2007 | |
| JP | 2007083762 | A | | 4/2007 | |
| JP | 2009210021 | A | | 9/2009 | |
| JP | 2012011921 | A | | 1/2012 | |
| KR | 20210151600 | A * | 12/2021 | ........... | B60R 21/214 |
| KR | 20240075167 | A * | 5/2024 | ........... | B60R 21/214 |
| WO | WO-9941113 | A1 * | 8/1999 | ........... | B60R 21/213 |
| WO | WO-2015169437 | A1 * | 11/2015 | ........... | B60R 21/214 |

OTHER PUBLICATIONS

Notice of Reasons for Refusal issued in counterpart Japanese Patent Application No. 2025-533341, dated Feb. 3, 2026.

\* cited by examiner

1120

1110

1120

1120    1220    1210    2000

1110

1300    1310        1330    1150

1310
1320
1300

VEHICLE ROOF AND VEHICLE

CROSS-REFERENCE TO RELATED APPLICATIONS

The present application is a continuation application of International Application No. PCT/CN2024/088511, filed on Apr. 18, 2024, which claims priority to Chinese Patent Application No. 202310452482.3, filed on Apr. 21, 2023, Chinese Patent Application No. 202310452487.6, filed on Apr. 21, 2023, and Chinese Patent Application No. 202310455015.6, filed on Apr. 21, 2023. The disclosures of the above-mentioned applications are incorporated herein by reference in their entireties.

TECHNICAL FIELD

The present disclosure relates to the technical field of vehicle ceilings, and in particular to a vehicle ceiling and a vehicle.

BACKGROUND

As an important component of a whole vehicle, the vehicle ceiling plays an indispensable role in improving the competitiveness of vehicles. With the increasing power of vehicle functions, the functions of vehicle ceilings are also evolving. In addition to enhancing the decorativeness of the interior of the vehicle, they also bear functional requirements. For example, for multi-purpose vehicles (MPV) models, the vehicle is usually equipped with atmosphere lights, reading lamps, video equipment, etc. The challenge of how to centrally mount and effectively secure these additional components has become more significant.

Traditional models are generally equipped with safety handles, and the vehicle ceiling is fixed by the safety handles. However, with the increasing requirements of consumers, the safety features of some luxury models have been enhanced, and the traditional safety handles are not needed. If the screw fixing method is employed, it will affect the beauty of the ceiling. The subsequent issue is how to effectively fix the vehicle ceiling, especially in special emergency situations, when the inflatable curtain of the car is unfolded, it is essential to ensure that the ceiling remains intact.

SUMMARY

The present disclosure provides a vehicle ceiling, including: a top metal plate, a roof panel assembly, and a dual lock. An inflatable curtain and an air curtain generator are provided close to one side of the top metal plate, and the air curtain generator is configured to generate gas to fill the inflatable curtain; the roof panel assembly is relatively fixed to the top metal plate, a first blasting line is provided in an area of the roof panel assembly corresponding to an installation position of the inflatable curtain; a plurality of dual locks are provided between the top metal plate and the roof panel assembly along the first blasting line, and the dual lock includes: a top dual lock and a bottom dual lock, the top dual lock is clamped on the top metal plate, the bottom dual lock is embedded in the roof panel assembly close to the top metal plate, and the bottom dual lock is not penetrated through the roof panel assembly and is away from the top metal plate.

In an embodiment, a buckle latch base is provided on one side of the roof panel assembly close to the top metal plate, a sliding groove is provided in the buckle latch base, the bottom dual lock is slidably connected to the sliding groove, and the sliding groove is configured to limit the bottom dual lock from separating from the sliding groove in a non-sliding groove direction.

In an embodiment, the dual lock is provided on one side of the first blasting line away from an edge of the roof panel assembly, and a direction in which the bottom dual lock slides into the sliding groove is not as same as an unfolding direction of the inflatable curtain.

In an embodiment, a blocking portion is provided on the buckle latch base, and the blocking portion is configured to block the sliding groove to prevent the bottom dual lock from sliding out of the sliding groove in a sliding-in direction.

In an embodiment, the top dual lock is fixed in coordination with the bottom dual lock in an interference by 1 mm to 3 mm.

In an embodiment, a second blasting line is provided on the roof panel assembly, and the second blasting line is provided on one side of the first blasting line close to an edge of the roof panel assembly.

In an embodiment, a shielding frame is provided on the top metal plate, and the shielding frame is provided between the air curtain generator and a reading lamp on the roof panel assembly.

In an embodiment, a baffle is provided between the air curtain generator and the inflatable curtain, and the baffle is fixed on the top metal plate.

In an embodiment, a bottom of the baffle is configured to be bent towards the air curtain generator.

In an embodiment, a harness hole is provided on the roof panel assembly, a harness clamp is inserted into the harness hole, and the harness clamp is configured to fix cables.

In an embodiment, the vehicle ceiling further includes a hollowed area and a reinforcement frame. The hollowed area is provided on the roof panel assembly; and the reinforcement frame is fixedly installed on an upper side of the roof panel assembly along an edge of the hollowed area. The reinforcement frame is connected to the top metal plate through a first connection member; a front end of the roof panel assembly is connected to the top metal plate through a second connection member; and a rear end of the roof panel assembly is connected to the top metal plate through a third connection member.

In an embodiment, the first connection member includes a magnetic attraction member, one end of the magnetic attraction member is configured to attract an iron sheet on the top metal plate, and another end of the magnetic attraction member is fixed on the reinforcement frame; a protruding portion is provided at a bottom of the magnetic attraction member, an inserting hole is provided on the reinforcement frame and is matched with a bottom cross-section of the magnetic attraction member provided with the protruding portion, and the protruding portion is configured to limit the magnetic attraction member from being separated from the reinforcement frame after the protruding portion passes through the inserting hole and is rotated; the magnetic attraction member includes a magnetic attraction portion and an installation portion, and balancing portions with plastic deformation are provided on both sides of the installation portion; and a supporting portion is provided on the balancing portion and is configured to support the installation portion after the balancing portions are deformed.

In an embodiment, a first installation hole is provided at a front end of the top metal plate, and a first deformation portion is provided on the second connection member;

in response to that the second connection member is inserted into the first installation hole, the first deformation portion is elastically deformed;

in response to that the second connection member is inserted into a preset position, a deformation of the first deformation portion is decreased, and the first deformation portion is configured to limit the second connection member from being separated from the first installation hole;

a second installation hole is provided on one side of the second connection member close to the roof panel assembly, and a second deformation portion is provided on the second connection member;

in response to that a self-tapping screw is screwed into the second installation hole, the second deformation portion is squeezed to deform by the self-tapping screw, so as to limit the second connection member from being separated from the first installation hole; and a deformation direction of the first deformation portion is perpendicular to a deformation direction of the second deformation portion.

In an embodiment, the vehicle ceiling further includes an air vent shell provided between the top metal plate and the roof panel assembly; and a plurality of connection buckles provided at one end of the air vent shell towards the top metal plate; the air vent shell is clamped on the top metal plate through the plurality of connection buckles.

The present disclosure also provides a vehicle, including the vehicle ceiling.

It should be understood that the above general description and the following detailed description are exemplary and explanatory only, and are not intended to limit the present disclosure.

BRIEF DESCRIPTION OF THE DRAWINGS

In order to illustrate the technical solutions in the embodiments of the present disclosure more clearly, the following briefly introduces the accompanying drawings required for the description of the embodiments. The drawings in the following description are only part of embodiments of the present disclosure. For those skilled in the art, other drawings can also be obtained according to the structures shown in these drawings without any creative effort.

DETAILED DESCRIPTION OF THE
EMBODIMENTS

The following are embodiments of the present disclosure through specific examples. Those skilled in the art can easily understand other advantages and effects of the present disclosure from the contents disclosed in this specification. The present disclosure can also be implemented or applied through other different specific embodiments, and the details in this specification can also be modified or changed based on different viewpoints and disclosures without deviating from the spirit of the present disclosure. It should be noted that the following embodiments and the features in the embodiments can be combined with each other without conflict. It should also be understood that the terms used in the embodiments of the present disclosure are to describe specific embodiments, not to limit the scope of protection of the present disclosure. The test methods in the following examples that do not specify specific conditions are usually carried out under conventional conditions or under conditions recommended by various manufacturers.

When a numerical range is given in embodiments, it should be understood that unless otherwise specified in the present disclosure, the two endpoints of each numerical range and any value between the two endpoints can be selected. Unless otherwise defined, all technical and scientific terms used in the present disclosure are in accordance with the related art mastery and the records of the present disclosure by those skilled in the art. Any methods, equipment and materials of the related art similar to or equivalent to the methods, equipment and materials in the embodiments of the present disclosure can also be used to implement the present disclosure.

It should be noted that the terms such as "upper", "lower", "left", "right", "middle" and "one" cited in this specification are only for the convenience of description, and are not intended to limit the scope of the disclosure. The change or adjustment of their relative relationship shall also be regarded as the scope of the disclosure without substantial change of technical content.

Figure 6:
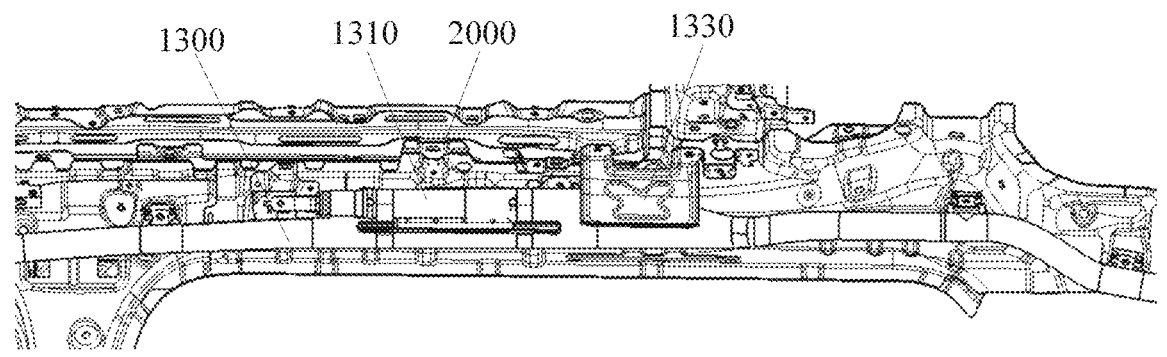
FIG. 6 is a schematic partial structural view of an air curtain generator at a top metal plate according to an embodiment of the present disclosure.

The present disclosure provides a vehicle ceiling, including a top metal plate 2000, a roof panel assembly 1100 and a dual lock 1200. Referring to FIG. 6, the top metal plate 2000 is provided with an inflatable curtain 1300 and an air curtain generator 1310 close to the side, and the air curtain generator 1310 is configured to quickly generate gas to fill the inflatable curtain 1300, so that the inflatable curtain 1300 can be quickly expanded and unfolded. The area corresponding to the installation position of the roof panel assembly 1100 and the inflatable curtain 1300 is provided with a first blasting line 1110. When the inflatable curtain 1300 is inflated and unfolded, the area of the first blasting line 1110 is more easily damaged and torn, so that the inflatable curtain 1300 can break through the roof panel assembly 1100 and unfold into the vehicle to protect the passengers in the vehicle.

Figure 4:
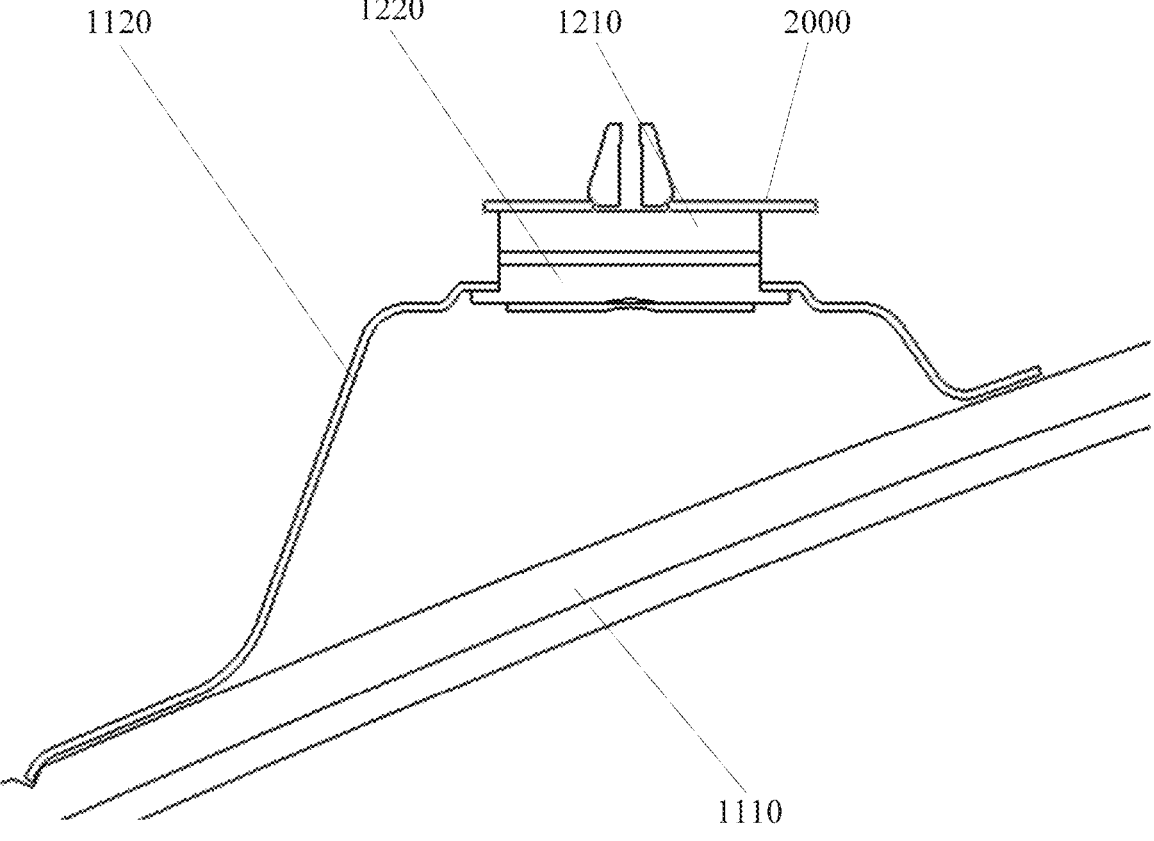
FIG. 4 is a schematic view showing a cooperation of a buckle latch base and the dual lock according to an embodiment of the present disclosure.

Referring to FIG. 4, the dual lock 1200 is provided between the top metal plate 2000 and the roof panel assembly 1100, so as to connect and fix the top metal plate 2000 and the roof panel assembly 1100. A plurality of dual locks 1200 are provided between the top metal plate 2000 and the roof panel assembly 1100 along the first blasting line 1110, so as to strengthen the connection strength between the first blasting line 1110 area, the top metal plate 2000 and the roof panel assembly 1100, and prevent the roof panel assembly 1100 from being separated from the top metal plate 2000 when the inflatable curtain 1300 is deployed into the vehicle along the first blasting line 1110. In an embodiment, the inflatable curtain 1300 is provided on both sides of the top metal plate 2000, and the first blasting line 1110 is provided on both sides of the roof panel assembly 1100, so as to effectively protect the vehicle occupants. A plurality of dual locks 1200 can be provided on one side, such as 2, 3, 4 or more, and are symmetrically provided on both sides. In an embodiment, three dual locks 1200 are provided on one side, and at least one dual lock 1200 is provided in the area corresponding to the air curtain generator 1310. The impact force of the inflatable curtain 1300 is the strongest at the air curtain generator 1310. The dual lock 1200 is provided here to effectively ensure that the roof panel assembly 1100 does not separate from the top metal plate 2000 when the inflatable curtain 1300 impacts.

Figure 1:
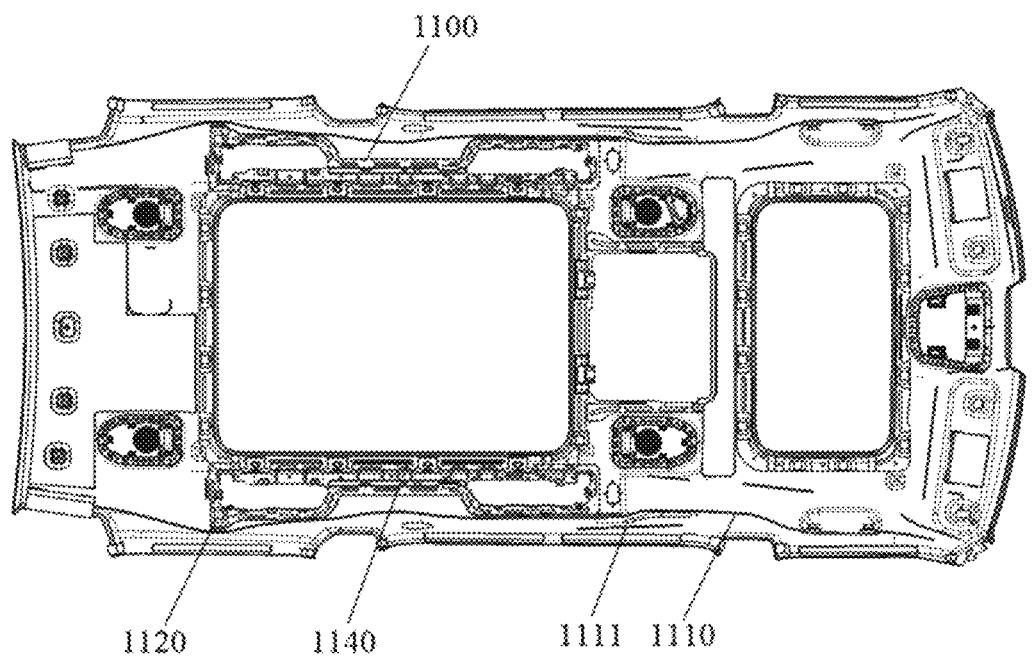
FIG. 1 is a schematic view of a roof panel assembly according to an embodiment of the present disclosure.
Figure 2:
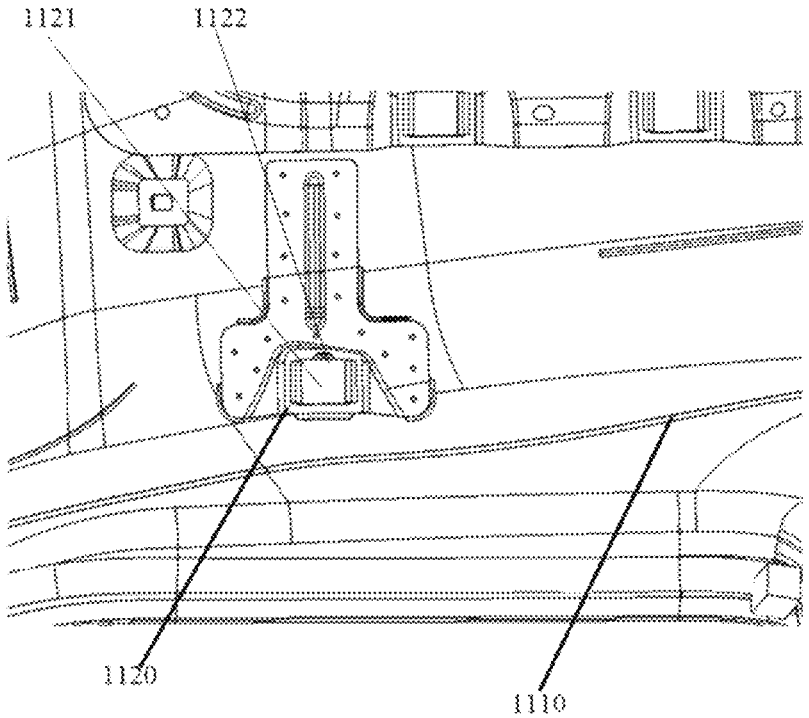
FIG. 2 is a schematic structural view of the roof panel assembly where the dual lock is provided according to an embodiment of the present disclosure.
Figure 3:
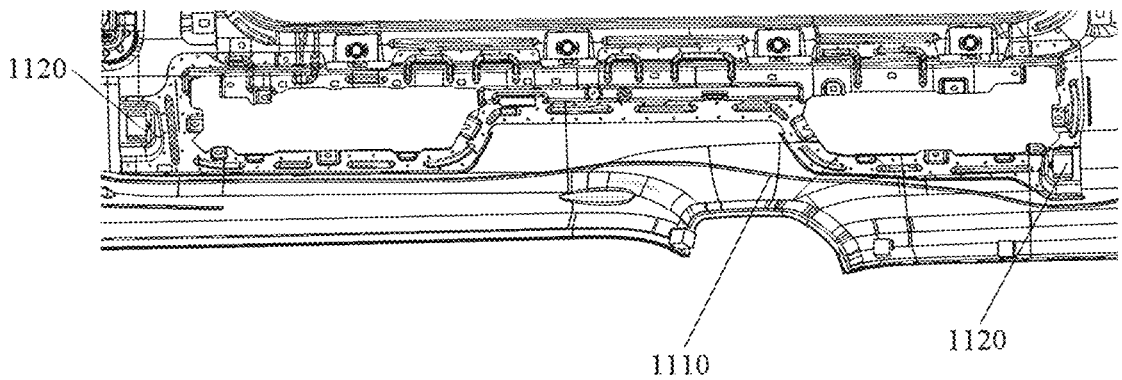
FIG. 3 is a schematic partial structural view of the roof panel assembly according to an embodiment of the present disclosure.

Referring to FIG. 1 to FIG. 2, in an embodiment, the dual lock 1200 is provided on the side of the first blasting line 1110 away from the edge of the roof panel assembly 1100. In other words, the first blasting line 1110 is close to the edge of the roof panel assembly 1100, and the dual lock 1200 is closer to the center of the roof panel assembly 1100 than the first blasting line 1110. When the inflatable curtain 1300 is unfolded, the first blasting line 1110 is torn, and the main weight of the roof panel assembly 1100 is concentrated in the central area. By placing the dual lock 1200 on the side close to the center of the roof panel assembly 1100, it is effectively ensured that after the first blasting line 1110 is torn, the dual lock 1200 still provides support for the roof panel assembly 1100, so as to prevent the roof panel assembly 1100 from being separated from the top metal plate 2000.

Referring to FIG. 4, in an embodiment, the dual lock 1200 includes a top dual lock 1210 and a bottom dual lock 1220 detachably fixed with the top dual lock 1210. In an embodiment, the dual lock 1200 is a dual lock, the top dual lock 1210 and the bottom dual lock 1220 are in an interference fit of 1 to 3 mm, and the interference range is between 1 to 3 mm, such as 1 mm, 2 mm, 3 mm, 1.3 mm, etc. Through the interference fit between the top dual lock 1210 and the bottom dual lock 1220, the stability of the connection of the dual lock 1200 can be ensured, and the waste of materials can be reduced, thereby saving costs.

Referring to FIG. 4, in an embodiment, the top dual lock 1210 is clamped on the top metal plate 2000, the bottom dual lock 1220 is embedded in the side of the roof panel assembly 1100 close to the top metal plate 2000, and the side of the bottom dual lock 1220 away from the top metal plate 2000 does not penetrate the roof panel assembly 1100, which can not only ensure the stability of the connection between the roof panel assembly 1100 and the top metal plate 2000, but also prevent the bottom dual lock 1220 from being exposed to the vehicle body and affecting the interior appearance, thus effectively improving the neatness and beauty of the ceiling in the vehicle body and improving the competitiveness of the vehicle.

Referring to FIG. 1 to FIG. 4, in an embodiment, a buckle latch base 1120 is provided on one side of the roof panel assembly 1100 close to the top metal plate 2000, a sliding groove 1121 is provided in the buckle latch base 1120, a bottom dual lock 1220 is slidably connected to the sliding groove 1121, and the sliding groove 1121 is configured to prevent the bottom dual lock 1220 from being separated from the sliding groove 1121 in a direction other than the sliding groove 1121. By disposing the buckle latch base 1120 on the roof panel assembly 1100 and disposing the sliding groove 1121 slidably connected to the bottom dual lock 1220 on the buckle latch base 1120, the bottom dual lock 1220 can be easily installed, the operation is convenient and simple, the requirements for workers to assemble are reduced, and the production efficiency is improved. In an embodiment, the bottom dual lock 1220 is in a T-shaped, and the sliding groove 1121 is a T-shaped groove. It is convenient to install the T-shaped bottom dual lock 1220 with the T-shaped groove, which effectively prevents the bottom dual lock 1220 from being separated from the buckle latch base 1120 in a direction other than the sliding groove 1121, thereby ensuring a stable connection between the bottom dual lock 1220 and the buckle latch base 1120, and preventing the roof panel assembly 1100 from falling off. In an embodiment, the bottom dual lock 1220 is in an interference fit with the sliding groove 1121, thereby preventing the bottom dual lock 1220 from being separated from the sliding groove 1121 after installation, and ensuring the stability of the connection.

Referring to FIG. 2, in an embodiment, a blocking portion 1122 is provided at one end of the sliding groove 1121, and the blocking portion 1122 is configured to block the sliding groove 1121, thereby preventing the bottom dual lock 1220 from sliding out of the sliding groove 1121 along the intended sliding direction. By providing the blocking portion 1122, the bottom dual lock 1220 can be prevented from sliding out of the sliding groove 1121, which not only facilitates positioning and installation, but also effectively improves the matching degree between the bottom dual lock 1220 and the buckle latch base 1120, thereby effectively ensuring the stable connection between the bottom dual lock 1220 and the buckle latch base 1120. In an embodiment, the blocking portion 1122 is a protrusion provided in the middle of the sliding groove 1121. The protrusion can partially block the sliding groove 1121 to limit the bottom dual lock 1220 from sliding out. By partially blocking the sliding groove 1121 with the protrusion, the amount of material required for the buckle latch base 1120 can be reduced, the cost can be reduced, and the weight can be reduced.

Figure 5:
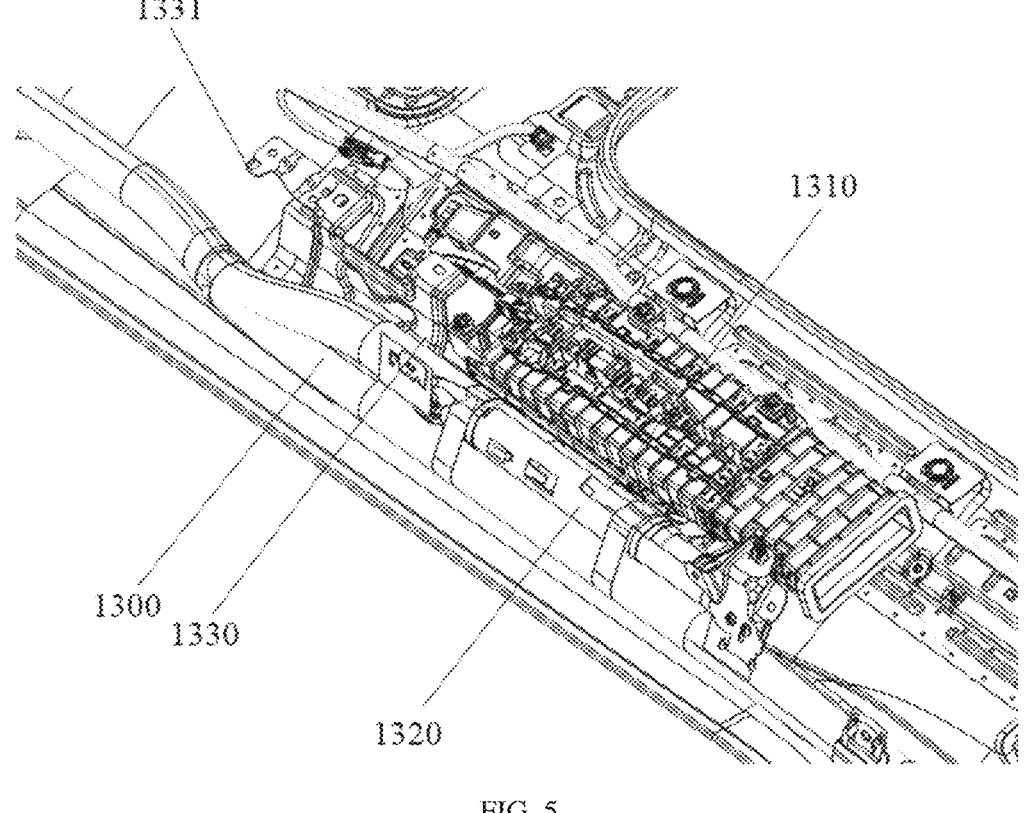
FIG. 5 is a schematic structural view of an inflatable curtain according to an embodiment of the present disclosure.

Referring to FIG. 4 and FIG. 5, in an embodiment, the direction in which the bottom dual lock 1220 slides into the sliding groove 1121 is not in the same direction as the unfolding direction of the inflatable curtain 1300. By orienting the sliding direction of the bottom dual lock 1220 differently from the unfolding direction of the inflatable curtain 1300, the bottom dual lock 1220 can be prevented from being separated from the sliding groove 1121 when the inflatable curtain 1300 is unfolded, thereby effectively improving the connection stability between the top metal plate 2000 and the roof panel assembly 1100. In an embodiment, the direction in which the bottom dual lock 1220 slides into the sliding groove 1121 is perpendicular to the unfolding direction of the inflatable curtain 1300.

In an embodiment, the blocking portion 1122 is provided at an end of the sliding groove 1121 away from the inflatable curtain 1300, and the bottom dual lock 1220 can only slide out of the sliding groove 1121 through an end of the sliding groove 1121 other than the blocking portion 1122. By disposing the blocking portion 1122 at an end of the sliding groove 1121 away from the inflatable curtain 1300, when the inflatable curtain 1300 impacts the first blasting line 1110, both sides of the first blasting line 1110 receive an impact force in a direction away from the first blasting line 1110. By disposing the blocking portion 1122 at an end away from the inflatable curtain 1300, when the inflatable curtain 1300 is unfolded, the roof panel assembly 1100 receives an impact force in a direction away from the first blasting line 1110. The blocking portion 1122 can prevent the bottom dual lock 1220 from being separated from the sliding groove 1121, thereby preventing the roof panel assembly 1100 from being separated from the top metal plate 2000, and improving the connection between the roof panel assembly 1100 and the top metal plate 2000 to be stable and firm.

In an embodiment, the buckle latch base 1120 can be made of metal or hard plastic, which can ensure the impact resistance of the buckle latch base 1120. In an embodiment, the buckle latch base 1120 is fixed to the side of the roof panel assembly 1100 close to the top metal plate 2000 by hot melt adhesive to ensure firm fixation. The buckle latch base 1120 replaces the original handle fixing structure, and the appearance is flat and not exposed, which not only ensures stable fixation, but also improves the aesthetic effect.

Referring to FIG. 1, in an embodiment, the buckle latch base 1120 is fixed to the reinforcement frame of the roof panel assembly 1100 to improve the connection strength between the roof panel assembly 1100 and the top metal plate 2000. In an embodiment, the buckle latch base 1120 is made of sheet metal. The sheet metal is bent and includes a fixed portion. The fixed portion is fixed to the reinforcement frame of the roof panel assembly 1100. An opening is provided on the sheet metal to form a sliding groove 1121 for accommodating the bottom dual lock 1220. A bending portion is provided on both sides of the opening. The bending portion is cooperated with the bottom dual lock 1220 to limit the shaking of the bottom dual lock 1220. Compared with directly providing the opening on a plane, providing the bending portion can increase the strength of the opening, prevent the sheet metal on both sides of the opening from being deformed when affected by the gravity of the roof panel assembly 1100, and enhance the bearing capacity.

Referring to FIG. 1, in an embodiment, a second blasting line 1111 is provided on the roof panel assembly 1100, and the second blasting line 1111 is provided on a side of the first blasting line 1110 close to the edge of the roof panel assembly 1100. By providing the second blasting line 1111 on the side of the first blasting line 1110 close to the edge of the roof panel assembly 1100, the roof panel assembly 1100 can be bent twice, ensuring that the inflatable curtain 1300 can be quickly and completely unfolded, reducing excessive impact on the roof panel assembly 1100, and protecting the integrity of the non-preset tearing area of the roof panel assembly 1100. In an embodiment, the second blasting line 1111 is provided at the connection between the air curtain generator 1310 and the inflatable curtain 1300. When the air curtain generator 1310 generates gas to fill the inflatable curtain 1300, the impact force at the connection between the inflatable curtain 1300 and the air curtain generator 1310 is the largest. By arranging the second blasting line 1111 at the connection between the air curtain generator 1310 and the inflatable curtain 1300, the roof panel assembly 1100 here can be more easily damaged, especially when the first blasting line 1110 is not enough to release the impact force of the inflatable curtain 1300 quickly after being torn, the second blasting line 1111 is torn and damaged, so that the roof panel assembly 1100 here can be bent twice, ensuring that the inflatable curtain 1300 can be fully unfolded, and preventing other areas of the roof panel assembly 1100 from being damaged by impact.

Figure 7:
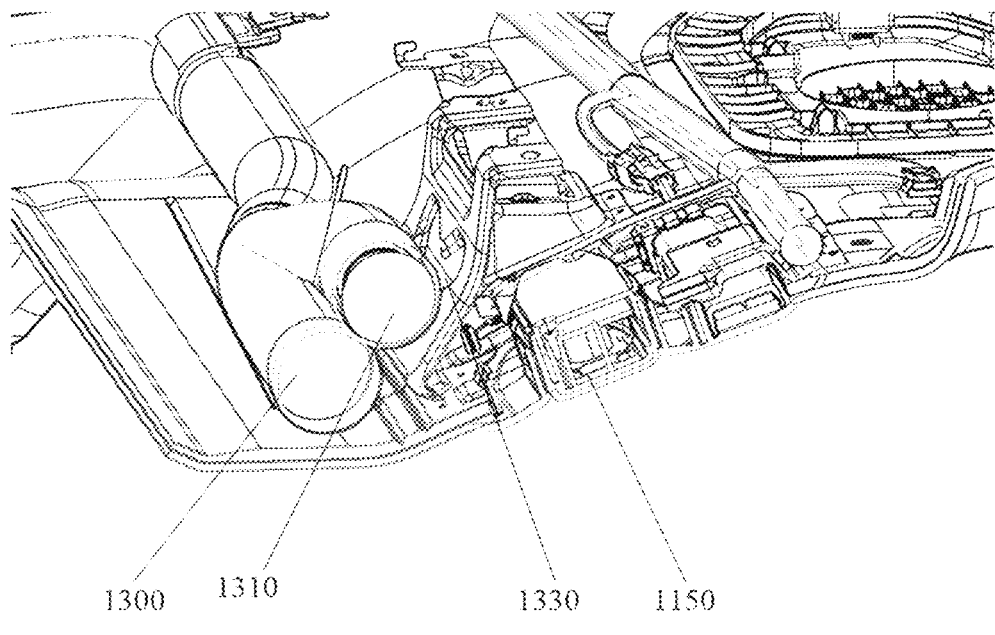
FIG. 7 is a partial cross-sectional view of the air curtain generator according to an embodiment of the present disclosure.

Referring to FIG. 5 and FIG. 7, in an embodiment, a shielding frame 1330 is provided on the top metal plate 2000, and the shielding frame 1330 is provided between the air curtain generator 1310 and the reading lamp 1150 on the roof panel assembly 1100. The shielding frame 1330 is provided at the connection between the air curtain generator 1310 and the inflatable curtain 1300. In an embodiment, the shielding frame 1330 is a metal member. When the air curtain generator 1310 generates gas rapidly, the connection between the inflatable curtain 1300 and the air curtain generator 1310 expands rapidly. By setting the shielding frame 1330, the inflatable curtain 1300 is shielded to prevent the inflatable curtain 1300 from impacting the reading lamp 1150 provided on the roof panel assembly 1100 when the inflatable curtain 1300 expands rapidly, thereby preventing the reading lamp 1150 on the roof panel assembly 1100 from flying out when the inflatable curtain 1300 is unfolded, and ensuring the safety of the passengers in the vehicle.

In an embodiment, the shielding frame 1330 can be fixed on the top metal plate 2000 by welding, bolt connection, etc. In an embodiment, the shielding frame 1330 is fixedly installed on the top metal plate 2000 through the bolt, which is convenient for installation. In an embodiment, a hitch-mounted hole is provided on the top metal plate 2000, and a first hitch-mounted portion 1331 is provided on the shielding frame 1330.

Figure 9:
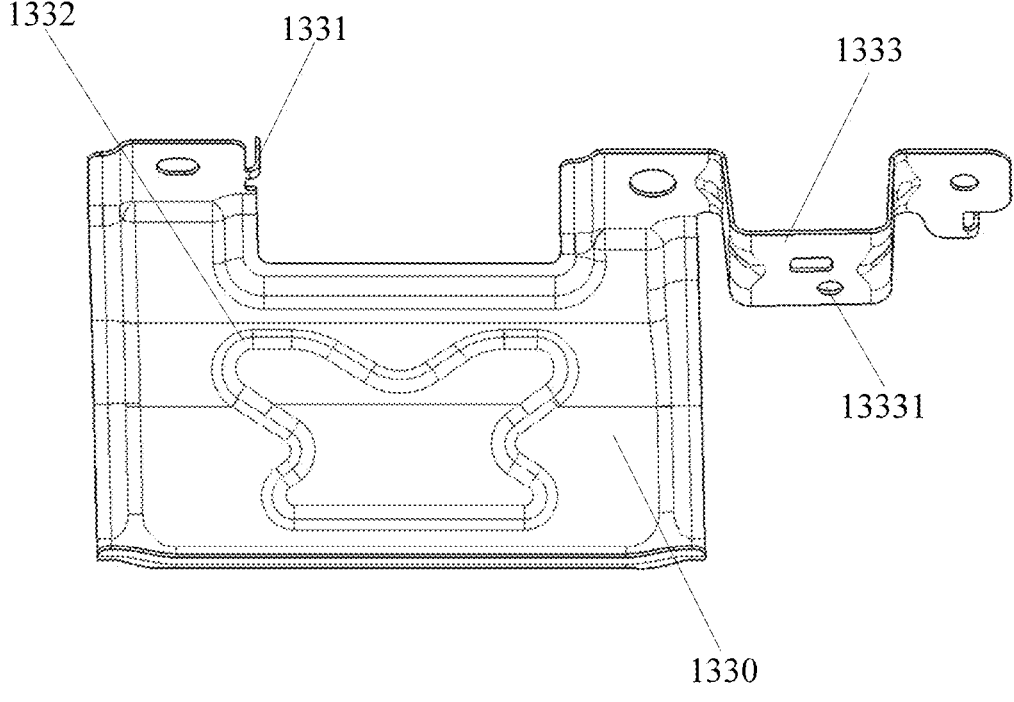
FIG. 9 is a schematic structural view of a shielding frame according to an embodiment of the present disclosure.

Referring to FIG. 9, in an embodiment, a hitch-mounted hole is provided on the top metal plate 2000, and a first hitch-mounted portion 1331 is provided on the shielding frame 1330. The first hitch-mounted portion 1331 is cooperated with the hitch-mounted hole to perform initial positioning and initial limiting on the shielding frame 1330, so as to facilitate further fixing of the shielding frame 1330 on the top metal plate 2000. When the shielding frame 1330 is fixed to the top metal plate 2000 by bolt connection, the first hitch-mounted portion 1331 is cooperated with the hitch-mounted hole to prevent the shielding frame 1330 from rotating with the bolt, so as to facilitate fixing. In an embodiment, the hitch-mounted hole is a long strip hole, and a recessed groove in the same direction as the hitch-mounted hole is provided on the first hitch-mounted portion 1331. When in use, after the first hitch-mounted portion 1331 passes through the hitch-mounted hole, the first hitch-mounted portion 1331 moves along the hitch-mounted hole, so that the top metal plate 2000 at the edge of the hitch-mounted hole is inserted into the recessed groove, thereby achieving the cooperation between the first hitch-mounted portion 1331 and the hitch-mounted hole. The thickness of the first hitch-mounted portion 1331 is the same as the width of the hitch-mounted hole. When the recessed groove of the first hitch-mounted portion 1331 is cooperated with the top metal plate 2000, the hitch-mounted hole limits the rotation of the first hitch-mounted portion 1331, which facilitates the positioning of the shielding frame 1330 on the one hand, and prevents the shielding frame 1330 from rotating when the shielding frame 1330 is bolted to the top metal plate 2000 on the other hand, thereby ensuring that the installation position and installation angle of the shielding frame 1330 are appropriate.

In an embodiment, the main body of the shielding frame 1330 is arc-shaped, and the arc-shaped shielding frame 1330 is adapted to the air curtain generator 1310, so that the main body of the shielding frame 1330 is evenly stressed, thereby improving the anti-impact capability of the shielding frame 1330 and increasing the protection range of the reading lamp 1150 on the roof panel assembly 1100. The arc is pointed to the axis of the connection between the air curtain generator 1310 and the inflatable curtain 1300, effectively ensuring the protection effect of the shielding frame 1330.

Referring to FIG. 9, in an embodiment, a shielding reinforcement rib 1332 is provided on the shielding frame 1330. The shielding reinforcement rib 1332 is provided on the side of the shielding frame 1330 away from the air curtain generator 1310. By providing the shielding reinforcement rib 1332, the impact resistance of the shielding frame 1330 can be improved, and the deformation of the shielding frame 1330 when impacted by the inflatable curtain 1300 can be reduced. In an embodiment, the shielding reinforcement rib 1332 can be welded to the side of the shielding frame 1330 away from the air curtain generator 1310, or the shielding reinforcement rib 1332 can be provided on the shielding frame 1330 by machining, or the shielding reinforcement rib 1332 can be formed by stamping the shielding frame 1330. In an embodiment, the shielding reinforcement rib 1332 is formed by stamping the shielding frame 1330. On the one hand, no additional material is needed, the weight of the shielding frame 1330 is reduced, the use of materials is reduced, and the cost is saved; on the other hand, the portion of the shielding reinforcement rib 1332 formed by stamping is recessed in the direction facing the inflatable curtain 1300, which can extend the action distance and action time of the inflatable curtain 1300 on the shielding frame 1330, thereby effectively reducing the impact of the inflatable curtain 1300 on the shielding frame 1330 and improving the impact resistance of the shielding frame 1330. In an embodiment, the edge of the shielding reinforcement rib 1332 is a curve. Compared with the edge being a straight line, when the shielding frame 1330 is impacted, the stress concentration can be reduced and the strength of the shielding frame 1330 can be improved. In an embodiment, the middle parts of both sides of the shielding reinforcement rib 1332 are recessed towards the center of the shielding reinforcement rib 1332. When the shielding reinforcement rib 1332 is stamped, the surface area of the baffle 1320 at the shielding reinforcement rib 1332 is reduced; and when the shielding reinforcement rib 1332 is impacted, the pressure on the surface increases, and the middle parts of both sides of the shielding reinforcement rib 1332 protrude towards the center of the shielding reinforcement rib 1332, so that the area of the shielding frame 1330 and the inflatable curtain 1300 when they first contact is increased, and the impact resistance is increased. In an embodiment, the shielding reinforcement rib 1332 is butterfly-shaped, and the upper middle part of the shielding reinforcement rib 1332 also protrudes towards the center of the shielding reinforcement rib 1332, further improving the impact resistance of the shielding frame 1330, and the protruding end points of the shielding reinforcement rib 1332 are arcs to avoid stress concentration and improve the impact resistance of the shielding frame 1330.

Referring to FIG. 9, in an embodiment, a clamping portion 1333 protruding towards the roof panel assembly 1100 is provided on the shielding frame 1330, and a clamping hole 13331 is provided on the clamping portion 1333 to accommodate the insertion of the top dual lock 1210. For the area where the reading lamp 1150 is provided, the distance between the roof panel assembly 1100 and the top metal plate 2000 is relatively large, and the air curtain generator 1310 is provided in this area, so that when the inflatable curtain 1300 is deployed, the impact force is relatively large. If the top metal plate 2000 and the roof panel assembly 1100 are directly fixed by the dual lock 1200, the dual lock 1200 will need to have a longer size, which requires separate customization on the one hand, and on the other hand, the longer the length of the dual lock 1200, the worse the fixation and strength. By providing a clamping portion 1333 protruding towards the roof panel assembly 1100 on the shielding frame 1330, it is convenient for the dual lock 1200 to connect the roof panel assembly 1100 and the top metal plate 2000. The shielding frame 1330 itself has a protective function and has a high connection strength with the top metal plate 2000. Therefore, the top dual lock 1210 is provided on the shielding frame 1330 to ensure a firm and stable connection.

In an embodiment, the bottom of the shielding frame 1330 is bent away from the inflatable curtain 1300. The shielding frame 1330 is a metal frame. By bending the bottom of the shielding frame 1330 away from the inflatable curtain 1300, it can be avoided that when the inflatable curtain 1300 impacts, the inflatable curtain 1300 contacts the edge of the shielding frame 1330 and causes the inflatable curtain 1300 to be damaged. It not only effectively protects the atmosphere lights on the roof panel assembly 1100, but also protects the inflatable curtain 1300, avoiding the inflatable curtain 1300 from being damaged and losing the protective effect.

Figure 8:
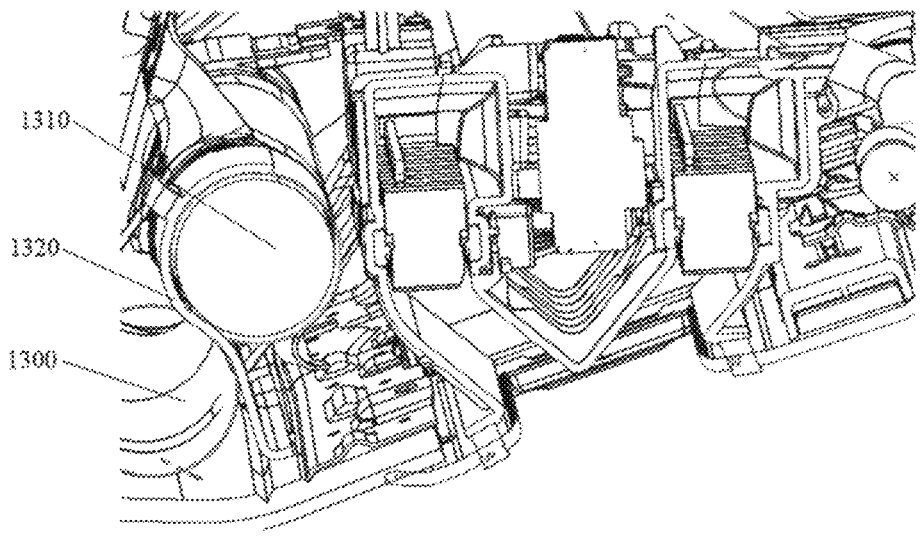
FIG. 8 is a partial cross-sectional view of the air curtain generator according to an embodiment of the present disclosure.

Referring to FIG. 6 and FIG. 8, in an embodiment, a baffle 1320 is provided between the air curtain generator 1310 and the inflatable curtain 1300. In order to ensure that the inflatable curtain 1300 can expand quickly, the air curtain generator 1310 is usually provided in parallel with the inflatable curtain 1300. By setting the baffle 1320 between the inflatable curtain 1300 and the air curtain generator 1310, the inflatable curtain 1300 can be effectively prevented from impacting the air curtain generator 1310 when it is unfolded, and the air curtain generator 1310 can be protected. In an embodiment, the lower part of the baffle 1320 is pointed to the direction of the first blasting line 1110, guiding the unfolding direction of the inflatable curtain 1300, which ensures that the inflatable curtain 1300 is quickly unfolded in a predetermined direction, and improves the protection of the occupants in the vehicle. In an embodiment, the bottom edge of the baffle 1320 is bent in the direction of the air curtain generator 1310. In other words, the bottom edge of the baffle 1320 is bent away from the inflatable curtain 1300, so that when the inflatable curtain 1300 is unfolded, it avoids contact with the edge of the baffle 1320 to prevent the inflatable curtain 1300 from being damaged. The bottom bend of the baffle 1320 is a curved surface to avoid scratching the inflatable curtain 1300.

Figure 10:
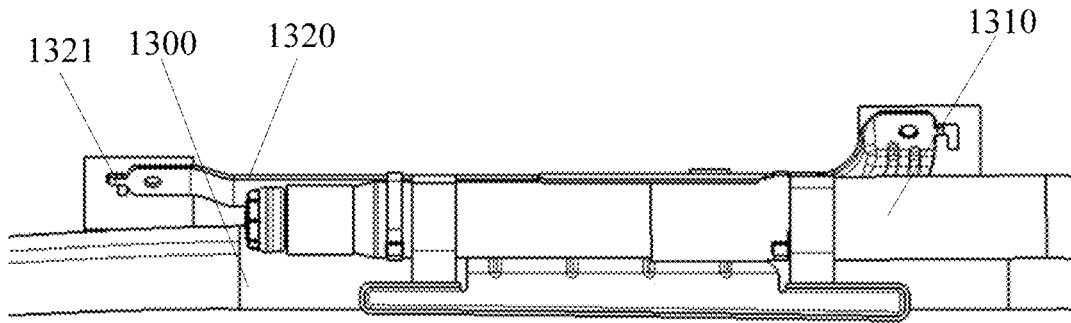
FIG. 10 is a schematic structural view of a baffle according to an embodiment of the present disclosure.
Figure 11:
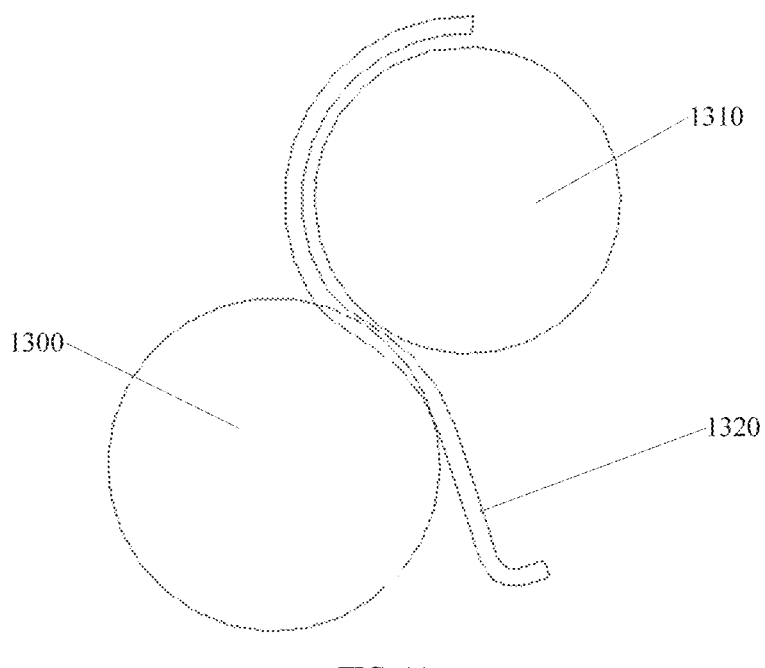
FIG. 11 is a schematic view of a function of the baffle according to an embodiment of the present disclosure.

Referring to FIG. 10 and FIG. 11, in an embodiment, the baffle 1320 is fixed on the top metal plate 2000. When the inflatable curtain 1300 is unfolded, the baffle 1320 is subjected to a large impact force. By directly fixing the baffle 1320 on the top metal plate 2000, the protection effect of the baffle 1320 can be effectively guaranteed, and the baffle 1320 can be prevented from falling off when the inflatable curtain 1300 is unfolded. In an embodiment, the baffle 1320 is bolt-connected to the top metal plate 2000 to ensure a stable connection. A second hitch-mounted portion 1321 is provided on the baffle 1320. The structure and function of the second hitch-mounted portion 1321 are similar to those of the first hitch-mounted portion 1331. The second hitch-mounted portion 1321 is cooperated with the hitch-mounted hole of the top metal plate 2000 to achieve initial positioning and initial limiting of the baffle 1320, thereby preventing the baffle 1320 from rotating when the bolt is fixed, and ensuring that the installation position and installation angle of the baffle 1320 are appropriate.

Figure 12:
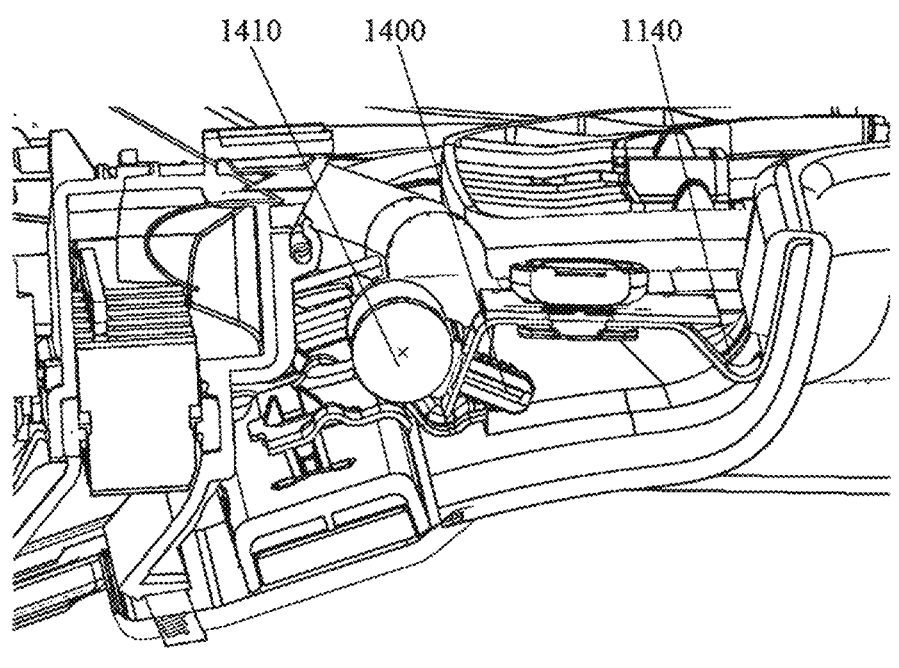
FIG. 12 is a schematic partial structural view of a harness clamp according to an embodiment of the present disclosure.
Figure 13:
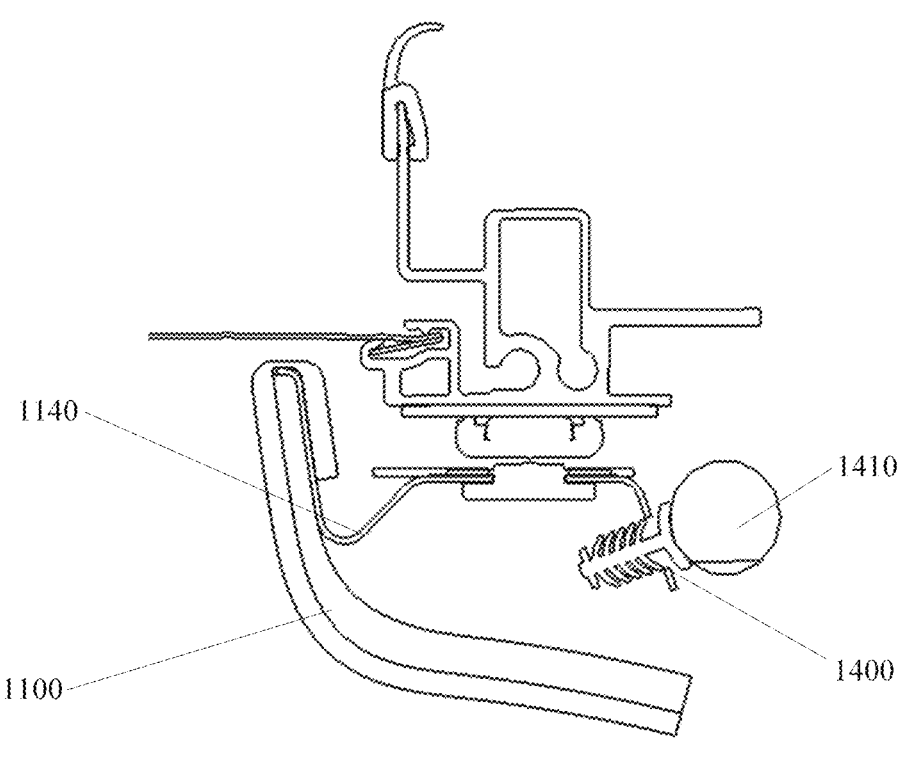
FIG. 13 is a schematic view of an installation of the harness clamp according to an embodiment of the present disclosure.

Referring to FIG. 12 and FIG. 13, in an embodiment, a harness hole is provided on the roof panel assembly 1100, a harness clamp 1400 is inserted into the harness hole, and the harness clamp 1400 can fix a cable 1410. In the related art, the cable 1410 is directly attached to the roof panel assembly 1100, but when the roof panel assembly 1100 is provided with a large skylight and has many integrated components, the area of the cable 1410 attached directly is small. In an embodiment, a sunroof frame 1140 is provided on the roof panel assembly 1100, and the weight of the sunroof frame 1140 is relatively concentrated. Usually, a fixed member connected to the top metal plate 2000 is provided on the sunroof frame 1140 to ensure that the sunroof frame 1140 can be firmly fixed. In an embodiment, a secondary bend is provided at the sunroof frame 1140 where the fixed member is at, and a harness hole is provided at the secondary bending. The harness clamp 1400 is inserted into the harness hole to relatively fix the cable 1410 and the roof panel assembly 1100. By providing the secondary bend, the harness clamp 1400 can avoid the fixed member of the sunroof frame 1140 and the top metal plate 2000, which facilitates the insertion of the harness clamp 1400 into the harness hole and facilitates installation. In an embodiment, the part where the harness clamp 1400 is inserted into the harness hole is tree-shaped to prevent the harness clamp 1400 from escaping from the harness hole.

The present disclosure provides a vehicle ceiling, and the sides of the top metal plate 2000 and the roof panel assembly 1100 are fixed by a hidden dual lock 1200, so that the roof panel assembly 1100 is firmly connected to the top metal plate 2000, and the interior aesthetics of the vehicle is improved. By setting a second blasting line 1111, it is convenient to unfold the inflatable curtain 1300; by setting a shielding frame 1330, the reading lamp 1150 can be effectively protected from flying out, and the safety of people in the vehicle can be guaranteed; by setting a baffle 1320, the unfolding of the inflatable curtain 1300 can be guided, and the roof panel assembly 1100 can be protected; by using a harness clamp 1400, the cable 1410 is fixed to the side of the sunroof frame 1140, and the abnormal noise of the cable 1410 is reduced.

Traditionally, the roof panel assembly 1100 is fixed to the top metal plate 2000 by using an exposed rivet and a handle screw on the roof panel assembly 1100. However, as vehicle requirements continue to improve and vehicle safety improves, the side handle is no longer needed. If the side handle is canceled, the side handle screw is no longer needed. However, other existing fixed members cannot guarantee the fixing strength between the roof panel assembly 1100 and the top metal plate 2000, resulting in the risk of the roof panel assembly 1100 falling off.

In view of this, in an embodiment of the present disclosure, the roof panel assembly 1100 and the top metal plate 2000 are connected by a connection member. The connection member can install and fix the roof panel assembly 1100 on the top metal plate 2000. The top metal plate 2000 is provided with an iron sheet 2210. In an embodiment, the iron sheet 2210 can be directly provided on the top metal plate 2000 or on the sunroof mechanism 2220 fixed on the top metal plate 2000.

Figure 15:
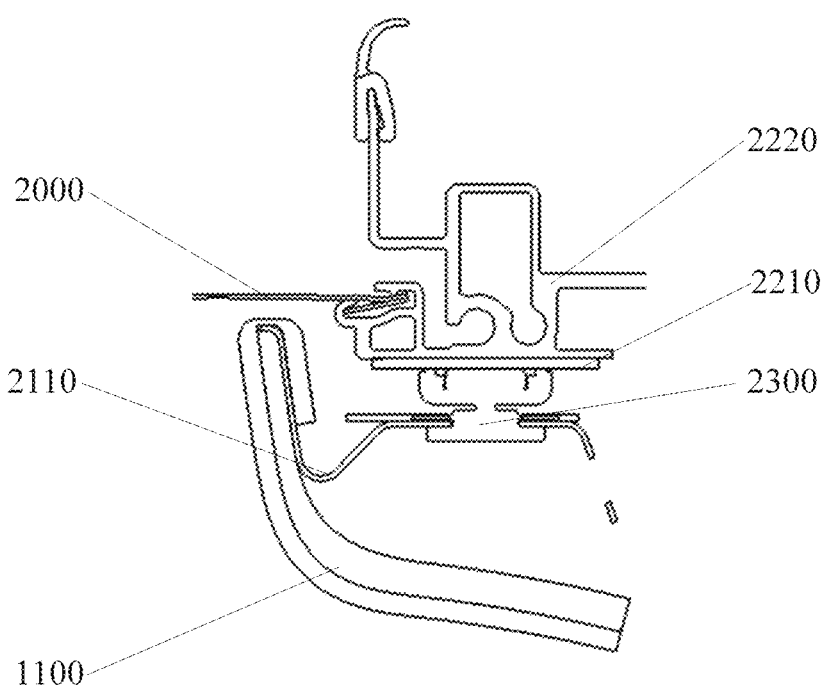
FIG. 15 is a schematic partial cross-sectional view where a magnetic attraction member is provided according to an embodiment of the present disclosure.
Figure 16:
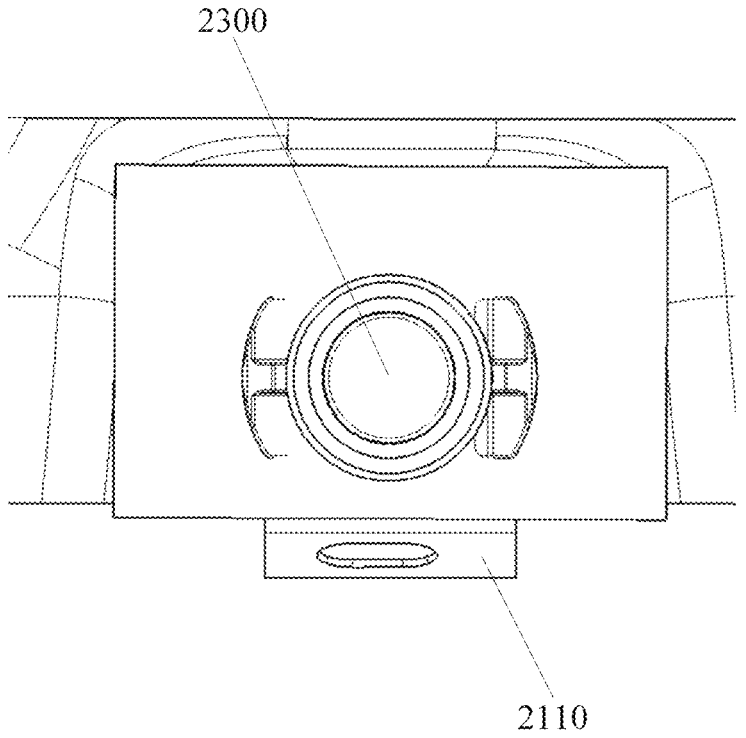
FIG. 16 is a top view of a partial structure after the magnetic attraction member is installed on the roof panel assembly according to an embodiment of the present disclosure.

Referring to FIG. 15, in an embodiment, the roof panel assembly 1100 is installed on the top metal plate 2000, a hollowed area is provided on the roof panel assembly 1100, a reinforcement frame 2110 is fixedly installed at the edge of the hollowed area, and the reinforcement frame 2110 is fixed on the upper side of the roof panel assembly 1100, that is, the side of the roof panel assembly 1100 close to the top metal plate 2000.

In an embodiment, a vehicle sunroof is provided in the area surrounded by the reinforcement frame 2110, and the reinforcement frame 2110 includes a sunroof frame 1140. For different vehicle models, the roof panel assembly 1100 has different hollowed areas, such as two front and rear hollowed areas are provided on some roof panel assemblies 1100 for installing the front and rear sunroofs. Some roof panel assemblies 1100 may be provided with ceiling screens, speakers, cameras, reading lamps, etc., which may be provided according to actual needs, and this disclosure does not impose any limitations thereon.

Figure 14:
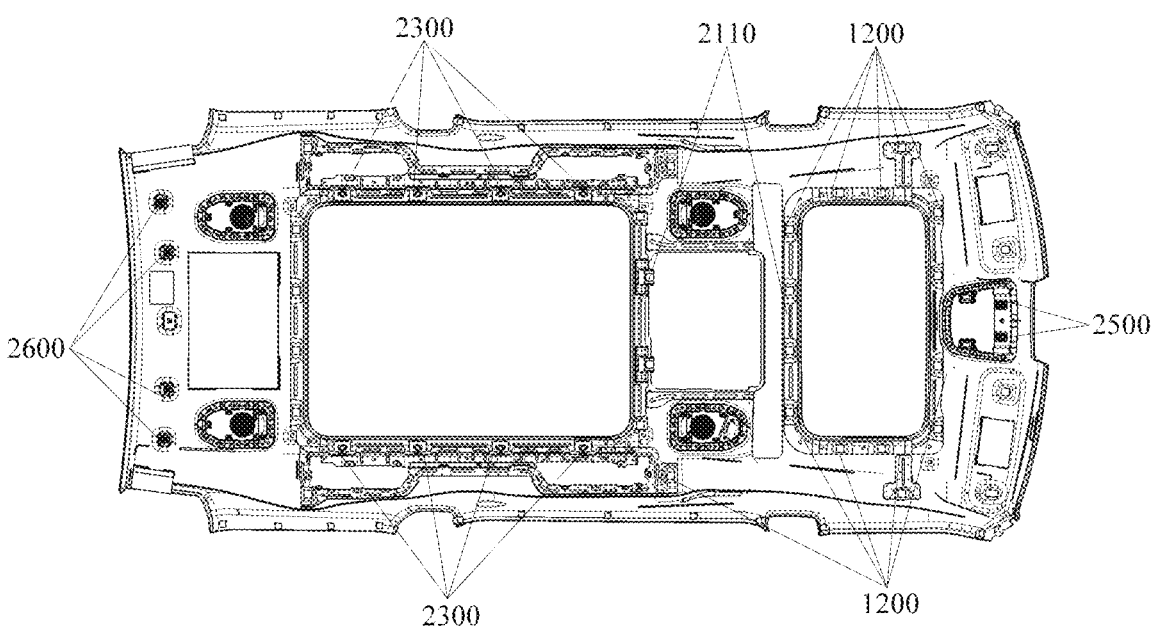
FIG. 14 is a schematic structural view of the roof panel assembly according to an embodiment of the present disclosure.

Referring to FIG. 14, in an embodiment, the connection member includes a first connection member, a second connection member 2500, and a third connection member 2600. The reinforcement frame 2110 is connected to the top metal plate 2000 through the first connection member, the front end of the roof panel assembly 1100 is connected to the top metal plate 2000 through the second connection member 2500, and the rear end of the roof panel assembly 1100 is connected to the top metal plate 2000 through the third connection member 2600. By using a combination of multiple connection members to fix the roof panel assembly 1100 on the top metal plate 2000, and coordinating the fixed members according to the weight distribution of the roof panel assembly 1100, the roof panel assembly 1100 and the top metal plate 2000 can be firmly connected, the cost can be saved, and the use of a connection member with a larger load in an area with a smaller force can be avoided, thereby reducing waste and improving product competitiveness.

Referring to FIG. 15 to FIG. 18, in an embodiment, the first connection member includes a magnetic attraction member 2300, and the magnetic attraction member 2300 is installed in the middle area of the roof panel assembly 1100. The middle area has a large weight and needs a connection member with a larger load. The magnetic attraction member 2300 has a large bearing capacity and can reach a bearing force of 60 N to 90 N. By introducing the magnetic attraction member 2300 to fix the roof panel assembly 1100 and the top metal plate 2000, the connection is more stable. In an embodiment, two reinforcement frames 2110 are provided on the roof panel assembly 1100, and the magnetic attraction member 2300 is only provided at the reinforcement frame 2110 at the rear of the vehicle, so as to reduce material waste and save costs while ensuring connection strength.

Figure 17:
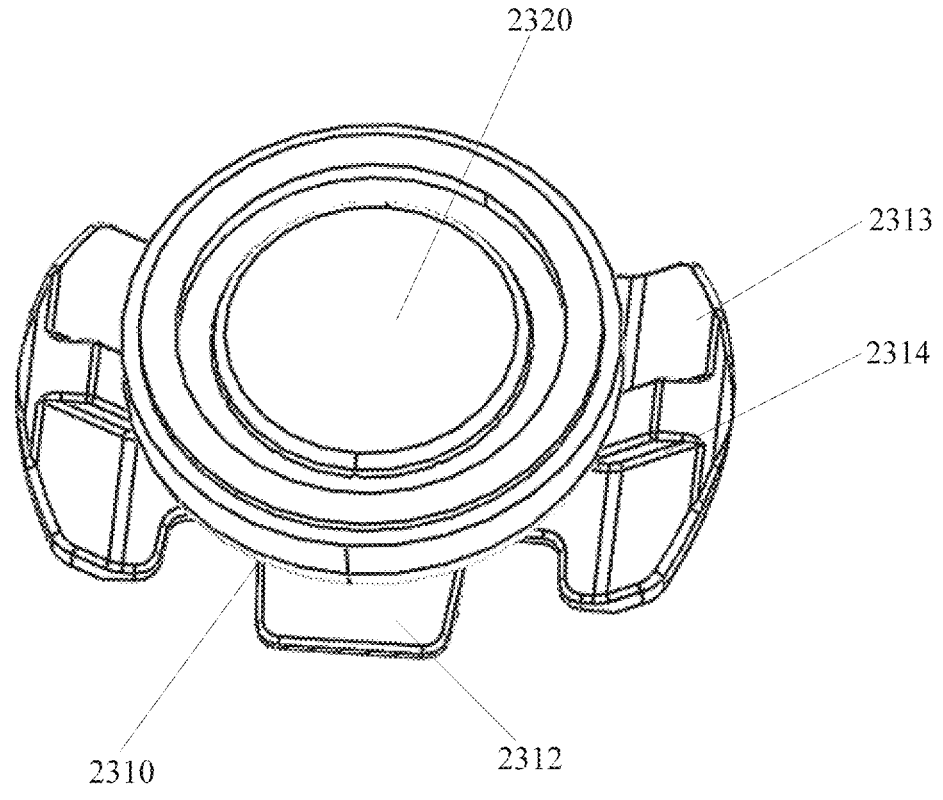
FIG. 17 is a schematic structural view of the magnetic attraction member according to an embodiment of the present disclosure.

Referring to FIG. 17, in an embodiment, the magnetic attraction member 2300 includes a magnetic attraction portion 2320 and an installation portion 2310. The magnetic attraction portion 2320 is a magnetic component for attracting the iron sheet 2210 on the top metal plate 2000. The installation portion 2310 can bear and fix the magnetic attraction portion 2320, and enable the magnetic attraction portion 2320 to be fixed on the roof panel assembly 1100. In an embodiment, the main body of the installation portion 2310 is bowl-shaped, and the magnetic attraction portion 2320 is provided on the top surface of the bowl. In an embodiment, the installation portion 2310 is plastic, which can facilitate the fixing of the magnetic attraction portion 2320. The installation portion 2310 is molded by injection molding, and a partial area of the magnetic attraction portion 2320 is covered, so that the magnetic attraction portion 2320 can be embedded in the installation portion 2310. In an embodiment, the magnetic attraction portion 2320 includes two parts, one of which is provided at the top center of the installation portion 2310, and the other part of which is provided in a ring shape at the top edge of the magnetic attraction portion 2320. The top surface of the magnetic attraction portion 2320 is slightly higher than the top surface of the installation portion 2310, so that the magnetic attraction portion 2320 can absorb the iron sheet 2210.

Figure 18:
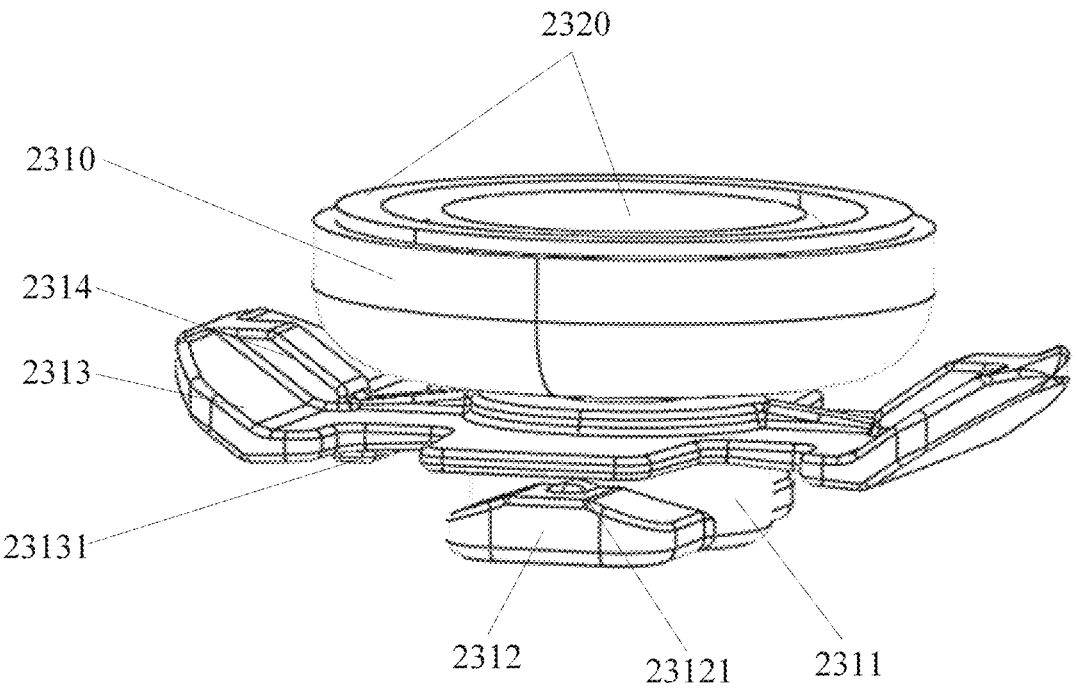
FIG. 18 is a schematic view of the magnetic attraction member from another angle according to an embodiment of the present disclosure.
Figure 19:
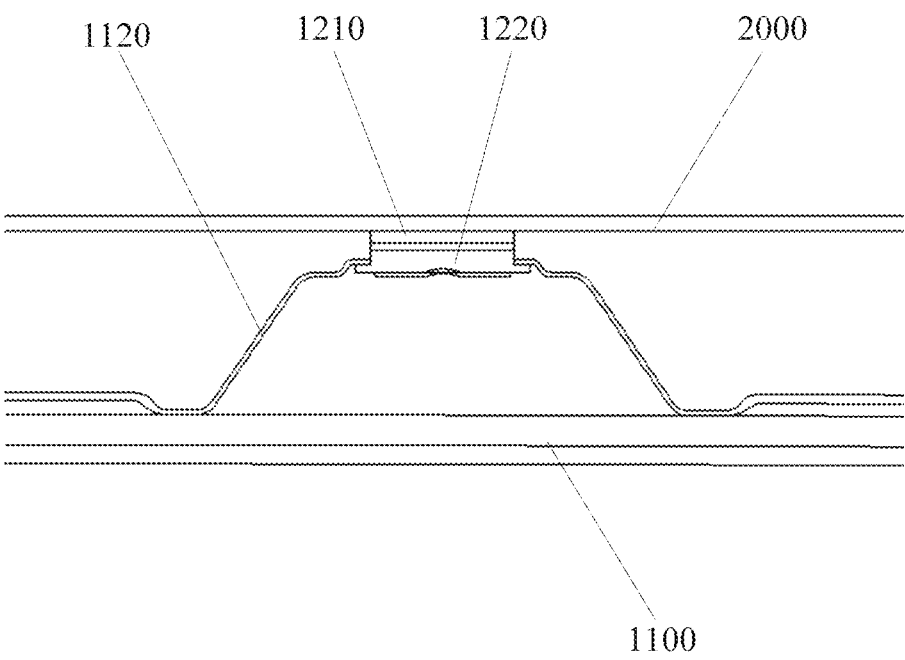
FIG. 19 is a schematic partial cross-sectional view where the dual lock is provided according to an embodiment of the present disclosure.
Figure 20:
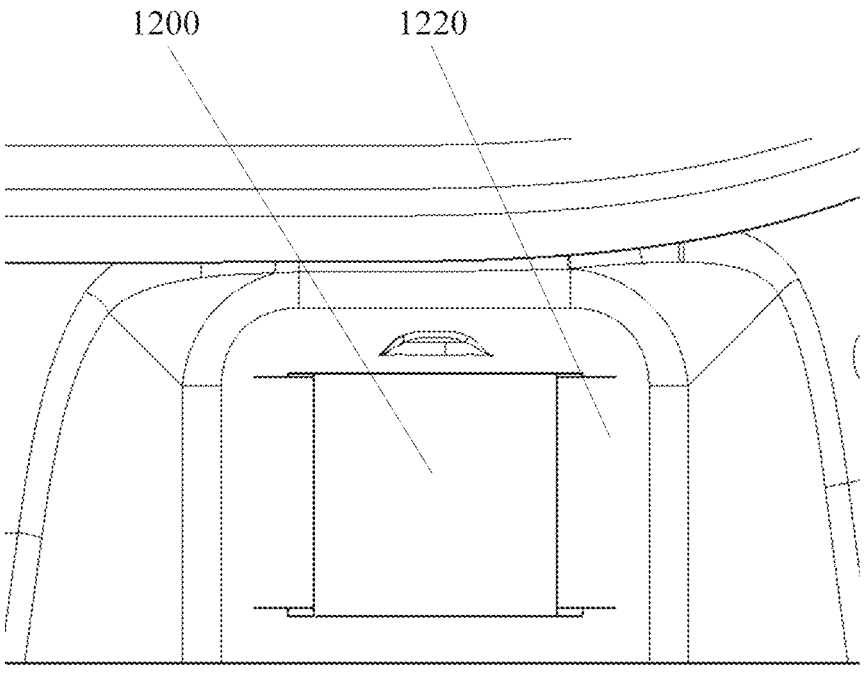
FIG. 20 is a top view after the dual lock is installed according to an embodiment of the present disclosure.
Figure 21:
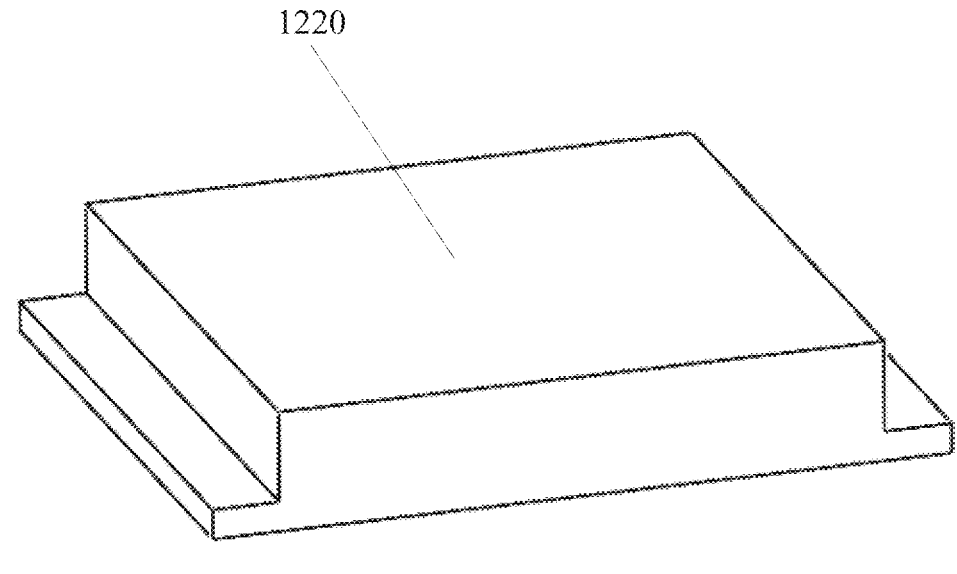
FIG. 21 is a schematic structural view of a bottom dual lock according to an embodiment of the present disclosure.

Referring to FIG. 18, in an embodiment, a connection portion 2311 is provided below the main body of the installation portion 2310, a protruding portion 2312 is provided at the edge of the connection portion 2311, an inserting hole is provided on the reinforcement frame 2110, and the inserting hole is matched with the cross section of the connection portion 2311 with the protruding portion 2312. During installation, the angles of the connection portion 2311 and the inserting hole are first adjusted to a matching position, and the connection portion 2311 is inserted into the inserting hole. After the protruding portion 2312 passes through the inserting hole, the magnetic attraction member 2300 is rotated, and the protruding portion 2312 can limit the magnetic attraction member 2300 from leaving the inserting hole. In an embodiment, the connection portion 2311 is cylindrical, and the protruding portion 2312 protrudes from the side of the cylinder. In an embodiment, two protruding portions 2312 are provided, and the two protruding portions 2312 are symmetrically provided on both sides of the connection portion 2311.

Referring to FIG. 18, in an embodiment, the top surface of the protruding portion 2312 is provided with a first clamping portion 23121. When the protruding portion 2312 passes through the inserting hole and rotates a certain angle, the first clamping portion 23121 is provided below the reinforcement frame 2110. In an embodiment, the top surface of the first clamping portion 23121 is an arc-shaped surface. A certain processing tolerance is allowed between the reinforcement frame 2110 and the iron sheet 2210 of the top metal plate 2000, which results in that the reinforcement frame 2110 and the iron sheet 2210 cannot be completely parallel. By providing the first clamping portion 23121, the contact area between the protruding portion 2312 and the reinforcement frame 2110 is reduced, so that it is easy to adjust the installation position of the magnetic attraction member 2300. When the reinforcement frame 2110 and the top metal plate 2000 are not completely parallel, it is ensured that the magnetic attraction portion 2320 can always completely absorb the iron sheet 2210. In an embodiment, the top surface of the first clamping portion 23121 is a spherical surface, so that the contact angle between the protruding portion 2312 and the reinforcement frame 2110 can be adjusted conveniently, ensuring that within the tolerance range, the magnetic attraction portion 2320 can completely absorb the iron sheet 2210, and avoiding the gap between the iron sheet 2210 and the magnetic attraction portion 2320 to affect the absorption effect, cause abnormal noise or other problems.

Referring to FIG. 17, in an embodiment, balancing portions 2313 which can be plastically deformed are provided on both sides of the installation portion 2310. When the magnetic attraction member 2300 is attracted onto the iron sheet 2210, by adjusting the balancing portion 2313, on the one hand, the overall center of gravity of the magnetic attraction member 2300 can be adjusted; on the other hand, for the case where part of the iron sheet 2210 is partially uneven, the magnetic attraction member 2300 will be slightly tilted. By adjusting the balancing portion 2313, the bottom surface of the balancing portion 2313 is made to contact the reinforcement frame 2110. By cooperating with the balancing portion 2313 and the protruding portion 2312 or the first clamping portion 23121, the reinforcement frame 2110 is clamped to ensure that the magnetic attraction member 2300 is installed stably and that the magnetic attraction member 2300 is stably connected to the iron sheet 2210. In an embodiment, after adjusting the balancing portion 2313, the end of the balancing portion 2313 rests on the installation portion 2310, so that the end and the bottom of the balancing portion 2313 provide support for the installation portion 2310 to prevent the magnetic attraction portion 2320 from tilting after installation. In an embodiment, a bending area is provided in the middle area of the balancing portion 2313. When the balancing portion 2313 is squeezed, the balancing portion 2313 is first bent by the bending area, which facilitates the control of the bending of the balancing portion 2313. When the balancing portion 2313 on one side supports the installation portion 2310, the bending area makes the balancing portion 2313 triangular, thereby improving the stability of the support and ensuring the support effect. In an embodiment, the bottom surface of the balancing portion 2313 is provided with a second clamping portion 23131. By providing the second clamping portion 23131, the contact area between the balancing portion 2313 and the reinforcement frame 2110 is reduced, and the balancing portion 2313 is easily adjusted. The second clamping portion 23131 and the first clamping portion 23121 can be more conveniently clamped on both sides of the reinforcement frame 2110 to ensure the stability of the magnetic attraction member 2300. Furthermore, the bottom surface of the second clamping portion 23131 is an arc-shaped surface, or a spherical surface, which is convenient for adjusting the angle between the second clamping portion 23131 and the top surface of the reinforcement frame 2110, ensuring the clamping effect, so that the installation of the magnetic attraction member 2300 is stable, and the adsorption of the magnetic attraction member 2300 to the iron sheet 2210 is more stable.

Referring to FIG. 17, in an embodiment, a supporting portion 2314 is provided on the balancing portion 2313. The supporting portion 2314 is provided along the extension direction of the balancing portion 2313. The cross-sectional size of the supporting portion 2314 is much smaller than the cross-sectional size of the balancing portion 2313. After adjusting the balancing portion 2313, the supporting portion 2314 is supported on the installation portion 2310, particularly, supported on the side of the installation portion 2310. On the one hand, the supporting portion 2314 plays the role of reinforcing ribs, improves the strength of the balancing portion 2313, and ensures the supporting effect; on the other hand, the supporting portion 2314 can reduce the contact area with the installation portion 2310, which is convenient for finding the supporting point and for adjustment.

In an embodiment, eight magnetic attraction members 2300 are provided, which are symmetrically provided on both sides of the reinforcement frame 2110 along the vehicle axis to ensure the stability of the support and the stable connection between the roof panel assembly 1100 and the top metal plate 2000.

In an embodiment, the first connection member further includes a dual lock 1200. The top dual lock 1210 is fixed on the top metal plate 2000, the bottom dual lock 1220 is provided on the roof panel assembly 1100, and the top dual lock 1210 is detachably fixed with the bottom dual lock 1220. In an embodiment, twenty-three to thirty dual locks 1200 are used to fix the roof panel assembly 1100 and the top metal plate 2000, and the number can be any one of twenty-three to thirty, such as twenty-three, twenty-five, twenty-six, twenty-eight and thirty, etc. Compared with the magnetic attraction member 2300, the dual lock 1200 has a weaker bearing capacity and a lower cost. By using a large number of dual locks 1200, the connection between the roof panel assembly 1100 and the top metal plate 2000 is stable and the cost is low. In an embodiment, a single dual lock 1200 can provide a pulling force of 19 N to 40 N to ensure that the roof panel assembly 1100 can be firmly fixed on the top metal plate 2000.

In an embodiment, two reinforcement frames 2110 are provided on the roof panel assembly 1100, and a plurality of dual locks 1200 are provided on the front reinforcement frame 2110 on the front side of the vehicle. The plurality of dual locks 1200 are evenly provided on the four sides of the front reinforcement frame 2110. In an embodiment, a total of twelve dual locks 1200 are provided on the four sides of the front reinforcement frame 2110, four dual locks 1200 are provided in each length direction of the front reinforcement frame 2110, and two dual locks 1200 are provided in each width direction to ensure a stable connection between the roof panel assembly 1100 and the top metal plate 2000. In an embodiment, a plurality of dual locks 1200 are also provided on the rear reinforcement frame 2110 of the roof panel assembly 1100. The dual locks 1200 are cooperated with the magnetic attraction member 2300 to support the area of the rear reinforcement frame 2110 of the roof panel assembly 1100. In an embodiment, the buckle latches on the rear reinforcement frame 2110 are provided on the rear reinforcement frame 2110 along the vehicle width direction, and four are provided on one side. The area of the rear reinforcement frame 2110 along the vehicle axis is subjected to greater force, and the magnetic attraction member 2300 is configured to support the force. The area of the rear reinforcement frame 2110 along the vehicle width direction is subjected to less force, and the dual locks 1200 are configured to assist the support, so as to ensure that the roof panel assembly 1100 is firmly fixed on the top metal plate 2000 while saving production costs.

In an embodiment, the portion along the blasting line is not at the reinforcement frame 2110, and the roof panel assembly 1100 is provided with a metal reinforcement along the blasting line to ensure a firm connection. The fixed portion is fixed to the reinforcement frame 2110 or the reinforcement of the roof panel assembly 1100.

Figure 22:
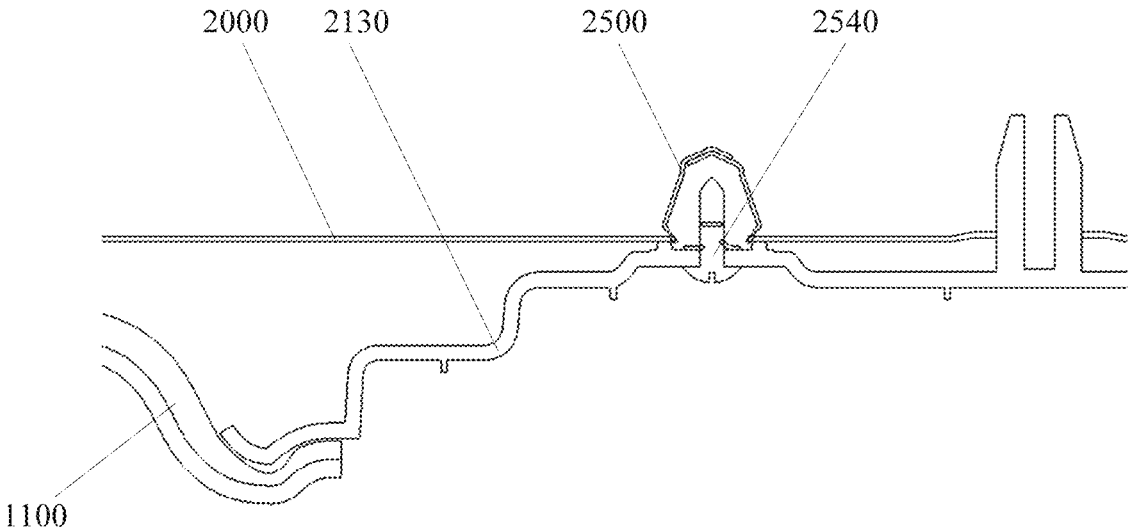
FIG. 22 is a schematic partial cross-sectional view where a second connection member is installed according to an embodiment of the present disclosure.

Referring to FIG. 22, in an embodiment, a front reading lamp bracket 2130 is provided at the front reading lamp of the front end of the roof panel assembly 1100. The front reading lamp bracket 2130 is configured to install the front reading lamp. In an embodiment, the front reading lamp can shield the front reading lamp bracket 2130 after installation. A second connection member 2500 is provided at the front reading lamp. The second connection member 2500 is cooperated with the self-tapping screw 2540 to achieve the fixation of the roof panel assembly 1100 and the top metal plate 2000. The self-tapping screw 2540 can be shielded by installing the front reading lamp, so that a lower-priced external leakage connection method can be configured at the front reading lamp bracket 2130 to reduce costs and improve efficiency.

In an embodiment, the top metal plate 2000 is provided with a first installation hole at the front reading lamp, and a limitation portion 2550 is provided on the second connection member 2500. The second connection member 2500 is inserted into the first installation hole, and the limitation portion 2550 can limit the second connection member 2500 from being completely immersed in the first installation hole. When in use, the limitation portion 2550 is provided between the roof panel assembly 1100 and the top metal plate 2000. In an embodiment, two second connection members 2500 are provided at the front reading lamp to improve the connection strength at the front reading lamp.

In an embodiment, the front reading lamp bracket 2130 is fixed on the roof panel assembly 1100, and the front reading lamp bracket 2130 is glued to the roof panel assembly 1100, which can be stably fixed and prevent the connection member from leaking out during use or affecting the appearance. The front reading lamp bracket 2130 is provided with a through hole, the self-tapping screw 2540 is fixed with the second connection member 2500 after passing through the hole, and the end diameter of the self-tapping screw 2540 is larger than the diameter of the through hole on the front reading lamp bracket 2130. The front reading lamp bracket 2130 is fixed with the top metal plate 2000 by cooperating with the self-tapping screw 2540 and the second connection member 2500.

Figure 23:
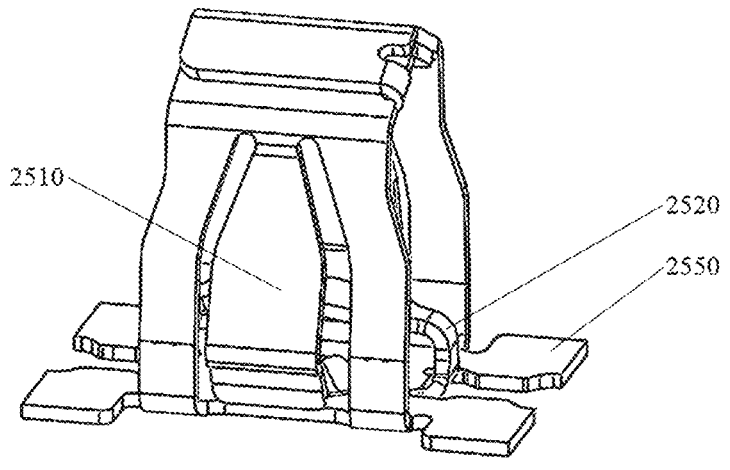
FIG. 23 is a schematic structural view of the second connection member according to an embodiment of the present disclosure.

Referring to FIG. 23, in an embodiment, the second connection member 2500 is provided with a first deformation portion 2510. When the second connection member 2500 is inserted into the first installation hole, the first deformation portion 2510 is elastically deformed. When the second connection member 2500 is inserted into the preset position, the deformation of the first deformation portion 2510 is reduced, and the first deformation portion 2510 can limit the second connection member 2500 from being separated from the first installation hole. In an embodiment, two first deformation portions 2510 are symmetrically provided on both sides of the body of the second connection member 2500. By providing the two first deformation portions 2510, after the second connection member 2500 is inserted into the first installation hole, the force is more uniform and the connection is more firmly secured.

Figure 24:
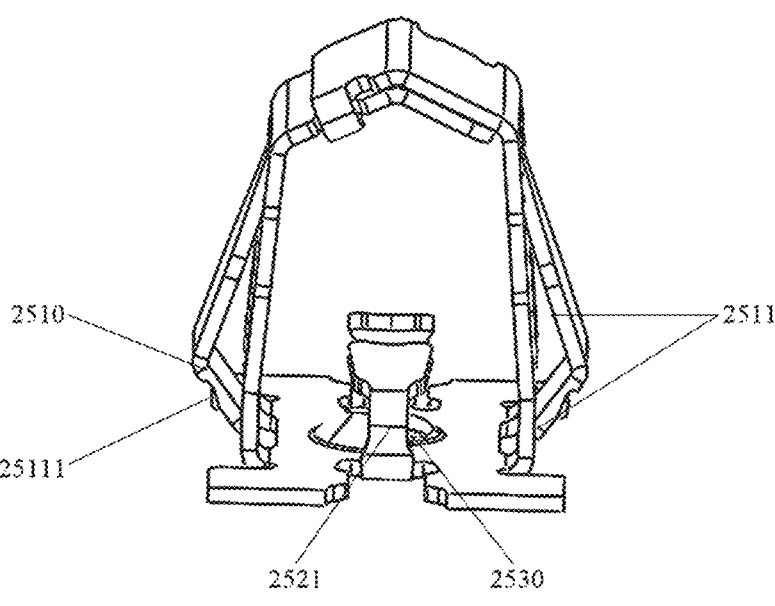
FIG. 24 is a schematic structural view of the second connection member from another angle according to an embodiment of the present disclosure.

Referring to FIG. 24, in an embodiment, the first deformation portion 2510 includes two first folding plates 2511. An obtuse angle is formed between the two first folding plates 2511, and the obtuse angles of the two first deformation portions 2510 are provided relative to each other. The upper first folding plate 2511 is inclined from top to bottom away from the center of the first installation hole, and the lower first folding plate 2511 is inclined from top to bottom towards the center of the first installation hole. When the first deformation portion 2510 is inserted into the first installation hole, the first folding plate 2511 is deformed towards the center of the first installation hole until the connection of the two first folding plates 2511 is inserted into the first installation hole, and the deformation of the first deformation portion 2510 begins to decrease until the deformation is restored. By providing two first folding plates 2511, the second connection member 2500 can be prevented from falling out of the first installation hole. In an embodiment, a limiting groove 25111 is provided on the first folding plate 2511 below, and the cross section of the limiting groove 25111 is a triangle, a semicircle, a rectangle, an arc, etc. When the first deformation portion 2510 is about to escape from the first installation hole, the first installation hole wall will be inserted into the limiting groove 25111, thereby limiting the first deformation portion 2510 from escaping from the first installation hole, and improving the bearing capacity of the second connection member 2500. By setting the two first folding plates 2511, the requirements for processing accuracy are lower, and the first deformation portion 2510 can still be deformed and installed in the first installation hole when it has a large processing deviation, thus meeting more use requirements.

Figure 26:
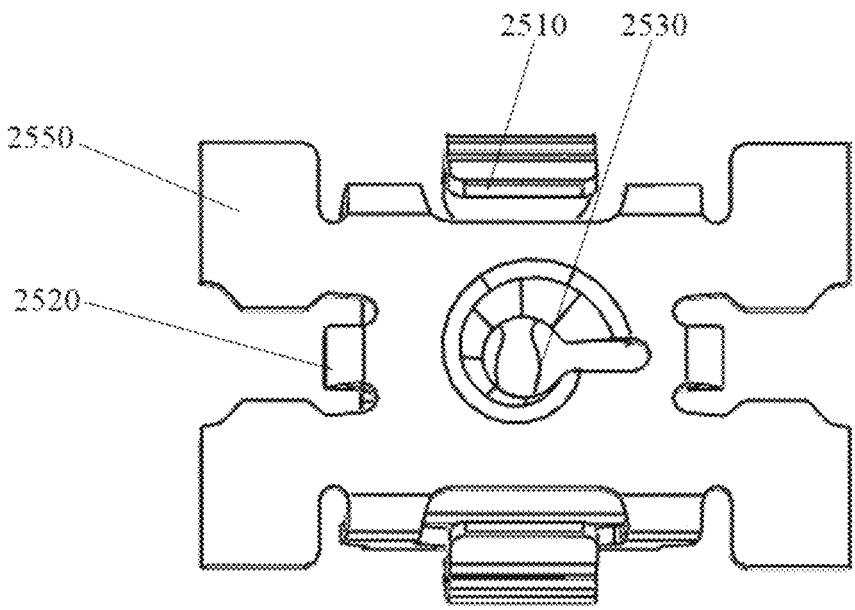
FIG. 26 is a bottom view of the second connection member according to an embodiment of the present disclosure.

Referring to FIG. 24 and FIG. 26, in an embodiment, a second installation hole 2530 is provided on one side of the second connection member 2500 close to the roof panel assembly 1100, and a second deformation portion 2520 is provided on the second connection member 2500. When the self-tapping screw 2540 is screwed into the second installation hole 2530, the second deformation portion 2520 is squeezed to deform by the self-tapping screw 2540, so as to prevent the second connection member 2500 from being separated from the first installation hole. By adding the second deformation portion 2520, the bearing capacity of the second connection member 2500 can be further improved. In an embodiment, the second deformation portion 2520 includes two second folding plates 2521, and an obtuse angle is formed between the two second folding plates 2521. The upper second folding plate 2521 at least partially blocks the second installation hole 2530. When the self-tapping screw 2540 is screwed into the second installation hole 2530, the part of the self-tapping screw 2540 screwed into the first installation hole squeezes the second deformation portion 2520 away from the center of the first installation hole, so that the second folding plate 2521 is clamped onto the upper side wall of the first installation hole. When the second connection member 2500 is to be separated from the first installation hole, the second folding plate 2521 needs to be deformed towards the center of the first installation hole, and the self-tapping screw 2540 can limit the second folding plate 2521 from deforming towards the center of the first installation hole, thereby ensuring the stable connection between the second connection member 2500 and the first installation hole, and ensuring the stable connection between the roof panel assembly 1100 and the top metal plate 2000. When the self-tapping screw 2540 is first unscrewed, the second folding plate 2521 can be deformed towards the center of the first installation hole, thereby facilitating the disassembly, maintenance, and replacement of the front reading lamp bracket 2130 or the roof panel assembly 1100.

Figure 25:
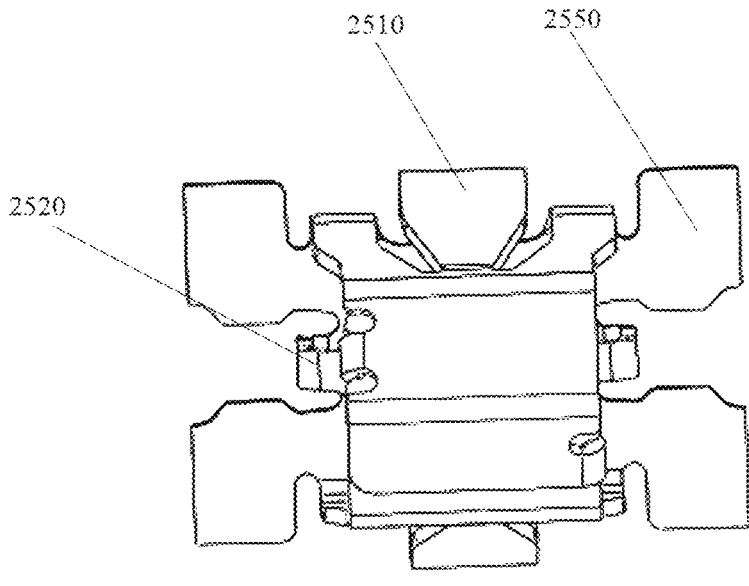
FIG. 25 is a top view of the second connection member according to an embodiment of the present disclosure.

Referring to FIG. 25, in an embodiment, the deformation direction of the first deformation portion 2510 is perpendicular to the deformation direction of the second deformation portion 2520. When bearing the force, the first deformation portion 2510 and the second deformation portion 2520 can be subjected to the force evenly, thereby improving the service life of the second connection member 2500.

Figure 27:
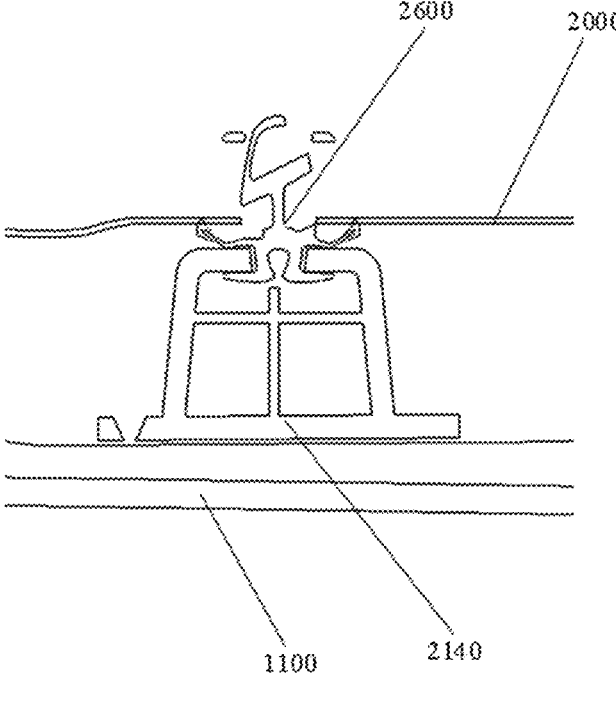
FIG. 27 is a schematic partial structural view after a second buckle is installed according to an embodiment of the present disclosure.
Figure 28:
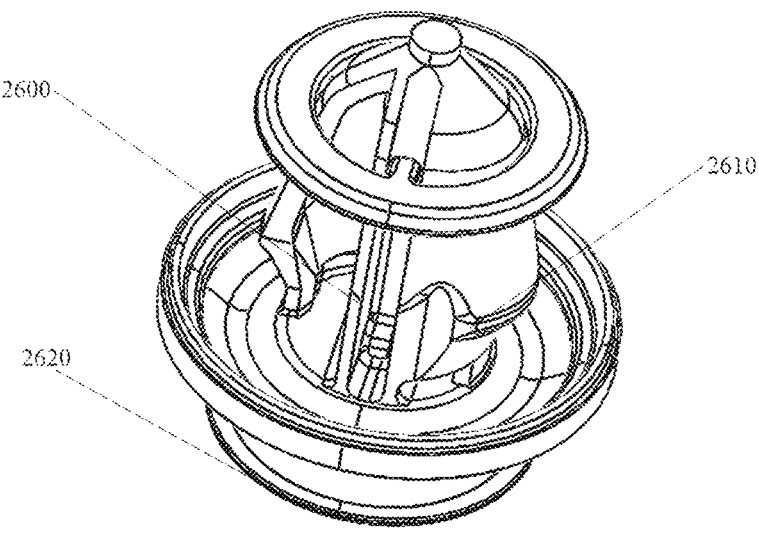
FIG. 28 is a schematic view of the second buckle according to an embodiment of the present disclosure.

Referring to FIG. 27 and FIG. 28, in an embodiment, the third connection member 2600 is provided at the rear end of the roof panel assembly 1100. In an embodiment, four third connection members 2600 are provided, all of which are installed at the tail of the vehicle ceiling. The tail of the vehicle ceiling has a small weight distribution, but needs to be hidden. By using the third connection member 2600 whose price and bearing force are lower than those of the dual lock 1200, the relative fixation of the roof panel assembly 1100 and the top metal plate 2000 can be met, and the cost can be reduced. In an embodiment, a third installation hole is provided at one end of the top metal plate 2000 close to the rear of the vehicle, and a buckle base 2140 is provided on the roof panel assembly 1100. One end of the third connection member 2600 is inserted into the buckle base 2140, and the other end of the third connection member 2600 is inserted into the third installation hole.

In an embodiment, the third connection member 2600 is made of plastic material, a first limiting portion 2610 is provided on the third connection member 2600, and the first limiting portion 2610 can be elastically deformed. When the third connection member 2600 is inserted into the third installation hole, the first limiting portion 2610 is elastically deformed. After the third connection member 2600 is inserted into the third installation hole, the first limiting portion 2610 is returned to its original shape to limit the third connection member 2600 from being separated from the third installation hole.

Referring to FIG. 28, in an embodiment, a second limiting portion 2620 is provided at the bottom of the third connection member 2600, and an opening is provided on the buckle base 2140. When the third connection member 2600 is inserted into the opening of the buckle base 2140, the second limiting portion 2620 is elastically deformed. After the third connection member 2600 is inserted into the opening of the buckle base 2140, the second limiting portion 2620 is restored to limit the third connection member 2600 from being separated from the buckle base 2140. In an embodiment, in order to save the cost of the third connection member 2600, the second limiting portion 2620 of the third connection member 2600 is a plate-shaped structure with a larger cross-section, a sliding groove is provided on the buckle base 2140, the second limiting portion 2620 can slide into the sliding groove, and the sliding groove is cooperated with the second limiting portion 2620 to limit the third connection member 2600 from being separated from the buckle base 2140 along a non-sliding groove direction. Compared with other limiting structures, the plate-shaped limiting structure can save materials, simplify the structure and facilitate use.

In an embodiment, the buckle base 2140 is adhesively bonded to the side of the roof panel assembly 1100 close to the top metal plate 2000. The buckle base 2140 is in a terrace shape and has a hollow structure inside, which can reduce weight. In an embodiment, reinforcing ribs are provided in the buckle base 2140 to ensure the strength of the buckle base 2140 and to ensure that the roof panel assembly 1100 and the top metal plate 2000 are stably fixed.

The main function of the car ceiling air outlet is to achieve temperature regulation and ventilation inside the car. Usually, the car ceiling air outlet is directly fixed on the car ceiling. The multi-purpose vehicles (MPV) models have an extra-long ceiling, which is usually integrated with image recognition, business class folding screen, integrated atmosphere lamp, double skylight, electric vents, side inflatable curtains and other accessories, which requires the strength of the ceiling to meet the requirements of not breaking or deforming during installation, and not falling off during the deployment of the side inflatable curtain. The air outlet is directly fixed on the ceiling, which not only takes up space, but also increases the installation strength requirements of the ceiling. In addition, the inflatable curtain 1300 will directly impact the air outlet during the detonation process, causing the ceiling to deform and fall off.

Figure 29:
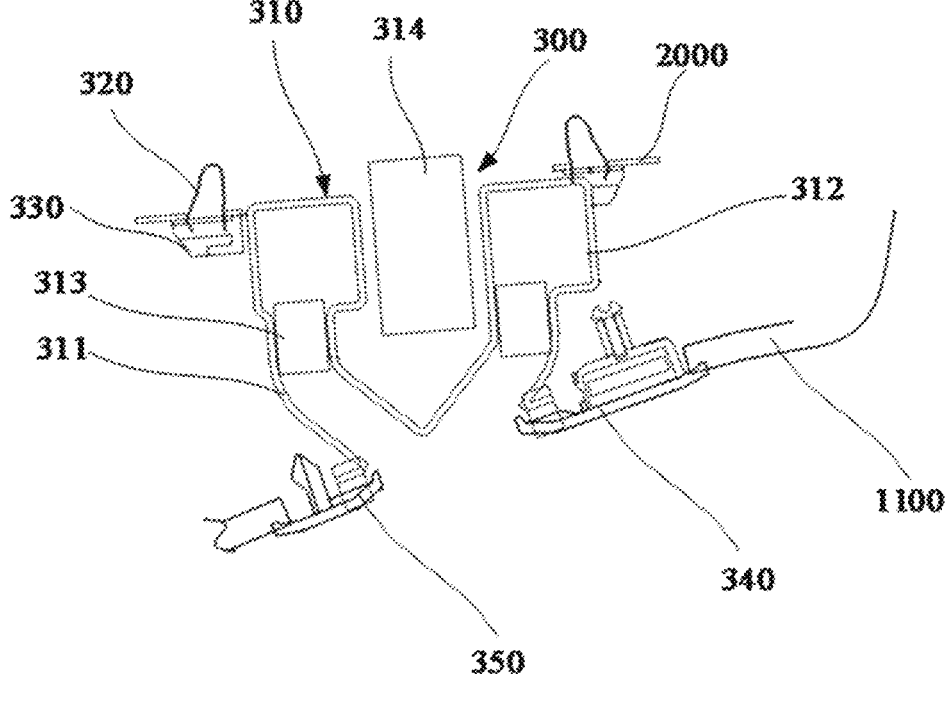
FIG. 29 is a schematic cross-sectional view of an air outlet installation structure according to an embodiment of the present disclosure.
Figure 30:
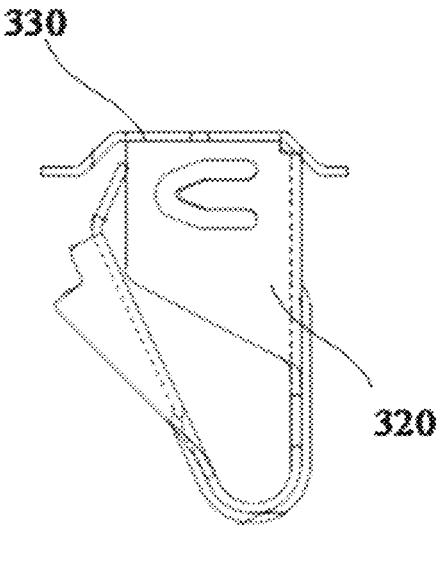
FIG. 30 is a schematic front view of a connection buckle of the air outlet installation structure according to an embodiment of the present disclosure.
Figure 31:
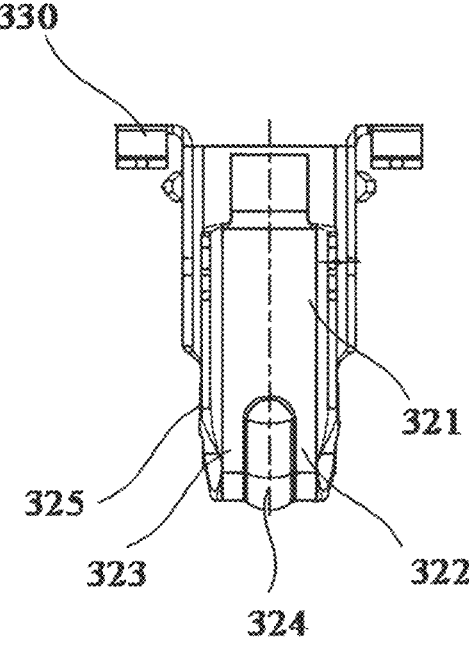
FIG. 31 is a schematic side view of the connection buckle of the air outlet installation structure according to an embodiment of the present disclosure.

In view of this, referring to FIG. 29 to FIG. 31, in an embodiment of the present disclosure, by installing the air vent assembly 300 on the top metal plate 2000, the installation space of the roof panel assembly 1100 is saved, and the bear weight required for the roof panel assembly 1100 is reduced, thereby mitigating deformation and the risk of the falling of the roof panel assembly 1100.

Referring to FIG. 29, in an embodiment, the vehicle ceiling further includes an air vent shell 310 and a plurality of connection buckles 320. The air vent shell 310 is provided between the top metal plate 2000 and the roof panel assembly 1100, the plurality of connection buckles 320 are provided at one end of the air vent shell 310 facing the top metal plate 2000, and the air vent shell 310 is clamped on the top metal plate 2000 through the plurality of connection buckles 320. By directly mounting the air vent shell 310 on the top metal plate 2000, the installation space can be saved and the load-bearing of the roof panel assembly 1100 can be reduced.

Referring to FIG. 29, FIG. 30 and FIG. 31, the air vent assembly 300 is provided between the top metal plate 2000 and the roof panel assembly 1100, and is clamped on the top metal plate 2000 through the plurality of connection buckles 320 on the air vent shell 310. In an embodiment, a plurality of connection buckles 320 are evenly distributed on one end of the air vent shell 310 facing the top metal plate 2000. An installation hole corresponding to the connection buckle 320 is provided on the top metal plate 2000. The connection buckle 320 is an elastic buckle. The connection buckle 320 is squeezed to be inserted into the installation hole on the top metal plate 2000. After the squeezing force is removed, the connection buckle 320 is restored and stuck on the installation hole. Specifically, the connection buckle 320 includes a connection base 321, a first clamping piece 322 and a second clamping piece 323. The connection base 321 is configured to be fixedly connected to the air vent shell 310, the first clamping piece 322 and the second clamping piece 323 are relatively provided on the connection base 321, and the gap between the first clamping piece 322 and the second clamping piece 323 forms a compressible recessed groove 324. The first clamping piece 322 and the second clamping piece 323 are both provided with a protruding step 325 that is cooperated with the installation hole. When the first clamping piece 322 and the second clamping piece 323 are squeezed, both of which shrink into the recessed groove 324 to insert the first clamping piece 322 and the second clamping piece 323 into the installation hole. After the squeezing force is eliminated, the step 325 on the first clamping piece 322 and the second clamping piece 323 are configured to clamp on the installation hole of the top metal plate 2000. In an embodiment, the first clamping piece 322 and the second clamping piece 323 are tapered, that is, the end facing the top metal plate 2000 is smaller, and the end facing the connection base 321 is larger. This structure has a certain guiding effect, which facilitates the connection buckle 320 to be inserted into the installation hole of the top metal plate 2000. The connection buckle 320 is fixedly connected to the air vent shell 310. For example, the top of the air vent shell 310 is provided with a buckle seat, which is described as the second buckle seat 330. The second buckle seat 330 and the air vent shell 310 are integrally injection molded. The second buckle seat 330 is provided with a sliding groove 331. The connection base 321 of the connection buckle 320 slides into the sliding groove 331 and is in an interference fit with the sliding groove 331. Of course, the connection buckle 320 and the air vent shell 310 may be fixed in other ways as long as the connection strength between the connection buckle 320 and the air vent shell 310 is guaranteed. In order to ensure the installation strength of the air vent assembly 300, the connection buckle 320 is a metal buckle.

Referring to FIG. 29, in an embodiment, the air outlet end of the air vent shell 310 is softly connected to the roof panel assembly 1100, and the two are crimped. The compression amount is configured to absorb the Z-direction tolerance to ensure that the wind direction is not disturbed, which can also avoid the deviation caused by hard connection assembly and can improve the assembly accuracy. Specifically, the roof panel assembly 1100 is provided with a hollowed area 210 at the position corresponding to the air vent shell 310, and the edge of the hollowed area 210 facing the air vent shell 310 is provided with an elastic sealing member 350. Further, an air vent panel 340 is provided between the air vent shell 310 and the roof panel assembly 1100, which can also be called as an atmosphere light panel. The air vent panel 340 is configured to fix the air vent shell 310 on the one hand, and is also configured to install the atmosphere light on the other hand. The air vent panel 340 is fixedly installed at the edge of the hollowed area 210. The air vent panel 340 is provided with an elastic sealing member 350 on one side facing the air vent shell 310. The air vent panel 340 compresses the air vent shell 310 by squeezing the elastic sealing member 350, which not only further fixes the air vent assembly 300, but also blocks the air vent assembly 300 to prevent the wind from being out of control. The elastic sealing member 350 can be a blocking sponge, which is provided around the air outlet end of the air vent shell 310. The elastic sealing member 350 can also be other blocking members with the same function, such as a rubber pad.

During the assembly process, the air vent assembly 300 is first mounted on the top metal plate 2000 using the connection buckle 320, the air vent panel 340 is fixed on the roof panel assembly 1100, the elastic sealing member 350 is fixed on the air vent panel 340, the roof panel assembly 1100 is buckled on the top metal plate 2000, and the elastic sealing member 350 squeezes the air vent shell 310 to achieve the fixation of the air vent assembly 300.

Referring to FIG. 29, in an embodiment, the air vent shell 310 includes a first air vent pipe 311 and a second air vent pipe 312. The first air vent pipe 311 and the second air vent pipe 312 are symmetrically provided and are communicated at the air outlet end. The air inlet ends of the first air vent pipe 311 and the second air vent pipe 312 are both communicated to the air inlet main duct, and the air blown out by the air conditioner flows to the first air vent pipe 311 and the second air vent pipe 312 through the air inlet main duct. Since the first air vent pipe 311 and the second air vent pipe 312 are communicated at the air outlet end, the airflow from the first air vent pipe 311 and the second air vent pipe 312 in different directions can be partially offset when they intersect at the air outlet end, and finally the wind with a larger air volume determines the overall wind direction of the air vent assembly 300. The air volume in the first air vent pipe 311 and the second air vent pipe 312 can be adjusted by the control component by controlling the air guide component in the air inlet main duct. In an embodiment, the first air vent pipe 311 and the second air vent pipe 312 are both provided with an air vent blade 313 and an air vent motor 314 for controlling the rotation of the air vent blade 313, the air vent motor 314 is connected to the control component, and the air vent blade 313 is adjusted by the control component to adjust the wind direction in the first air vent pipe 311 and the second air vent pipe 312.

The present disclosure also provides a vehicle, including any of the above-mentioned vehicle ceilings, and the vehicle ceiling is provided on the top of the vehicle. The vehicle also includes components such as a power system, a vehicle shell, and a control system. Referring to the existing vehicle, the present disclosure will not elaborate on this.

The present disclosure effectively overcomes some practical problems in the related art and has a high utilization value and use significance. The above embodiments are only illustrative of the principles and effects of the present disclosure, and are not intended to limit the present disclosure. Those skilled in the art can modify or change the above embodiments without violating the spirit and scope of the present disclosure. Therefore, all equivalent modifications or changes made by those skilled in the art without departing from the spirit and technical ideas disclosed by the present disclosure should still be covered by the claims of the present disclosure.

What is claimed is:

1. A vehicle ceiling, comprising:
a top metal plate, wherein an inflatable curtain and an air curtain generator are provided close to one side of the top metal plate, and the air curtain generator is configured to generate gas to fill the inflatable curtain;
a roof panel assembly relatively fixed to the top metal plate, wherein a first blasting line is provided in an area of the roof panel assembly corresponding to an installation position of the inflatable curtain; and
a dual lock, wherein a plurality of dual locks are provided between the top metal plate and the roof panel assem bly along the first blasting line, and the dual lock comprises:
a top dual lock clamped on the top metal plate; and
a bottom dual lock embedded in the roof panel assembly close to the top metal plate, wherein the bottom dual lock is not penetrated through the roof panel assembly and is away from the top metal plate;
wherein a shielding frame is provided on the top metal plate, and the shielding frame is provided between the air curtain generator and a reading lamp on the roof panel assembly.

2. The vehicle ceiling according to claim 1, wherein a buckle latch base is provided on one side of the roof panel assembly close to the top metal plate, a sliding groove is provided in the buckle latch base, the bottom dual lock is slidably connected to the sliding groove, and the sliding groove is configured to limit the bottom dual lock from separating from the sliding groove in a non-sliding groove direction.

3. The vehicle ceiling according to claim 2, wherein the dual lock is provided on one side of the first blasting line away from an edge of the roof panel assembly, and a direction in which the bottom dual lock slides into the sliding groove is not as same as an unfolding direction of the inflatable curtain.

4. The vehicle ceiling according to claim 2, wherein a blocking portion is provided on the buckle latch base, and the blocking portion is configured to block the sliding groove to prevent the bottom dual lock from sliding out of the sliding groove in a sliding-in direction.

5. The vehicle ceiling according to claim 2, wherein the top dual lock is fixed in coordination with the bottom dual lock in an interference by 1 mm to 3 mm, so as to ensure a stability of a connection of the dual lock.

6. The vehicle ceiling according to claim 1, wherein a second blasting line is provided on the roof panel assembly, and the second blasting line is provided on one side of the first blasting line close to an edge of the roof panel assembly.

7. The vehicle ceiling according to claim 1, wherein a shielding reinforcement rib is provided on one side of the shielding frame away from the air curtain generator.

8. The vehicle ceiling according to claim 1, wherein the air curtain generator is provided in parallel with the inflatable curtain, a baffle is provided between the air curtain generator and the inflatable curtain, and the baffle is fixed on the top metal plate.

9. The vehicle ceiling according to claim 8, wherein a bottom of the baffle is bent towards the air curtain generator and is bent away from the inflatable curtain, and a bottom bend of the baffle is a curved surface.

10. The vehicle ceiling according to claim 1, wherein a secondary bend is provided at the sunroof frame where a fixed member is located, a harness hole is provided at the secondary bend, a harness clamp is inserted into the harness hole to relatively fix a cable and the roof panel assembly, and the harness hole is tree-shaped.

11. The vehicle ceiling according to claim 1, further comprising:
a hollowed area provided on the roof panel assembly; and
a reinforcement frame fixedly installed on an upper side of the roof panel assembly along an edge of the hollowed area;
wherein the reinforcement frame is connected to the top metal plate through a first connection member;
a front end of the roof panel assembly is connected to the top metal plate through a second connection member; and a rear end of the roof panel assembly is connected to the top metal plate through a third connection member.

12. The vehicle ceiling according to claim 11, wherein the first connection member comprises a magnetic attraction member, one end of the magnetic attraction member is configured to attract an iron sheet on the top metal plate, and another end of the magnetic attraction member is fixed on the reinforcement frame;

a protruding portion is provided at a bottom of the magnetic attraction member, an inserting hole is provided on the reinforcement frame and is matched with a bottom cross-section of the magnetic attraction member provided with the protruding portion, and the protruding portion is configured to limit the magnetic attraction member from being separated from the reinforcement frame after the protruding portion passes through the inserting hole and is rotated;

the magnetic attraction member comprises a magnetic attraction portion and an installation portion, and balancing portions with plastic deformation are provided on both sides of the installation portion; and a supporting portion is provided on the balancing portion and is configured to support the installation portion after the balancing portions are deformed.

13. The vehicle ceiling according to claim 12, wherein a top surface of the protruding portion is provided with a first clamping portion;

in response to that the protruding portion passes through the inserting hole and rotates a certain angle, the first clamping portion is provided below the reinforcement frame; and a top surface of the first clamping portion is an arc-shaped surface.

14. The vehicle ceiling according to claim 11, wherein a first installation hole is provided at a front end of the top metal plate, and a first deformation portion is provided on the second connection member;

in response to that the second connection member is inserted into the first installation hole, the first deformation portion is elastically deformed;

in response to that the second connection member is inserted into a preset position, a deformation of the first deformation portion is decreased, and the first deformation portion is configured to limit the second connection member from being separated from the first installation hole;

a second installation hole is provided on one side of the second connection member close to the roof panel assembly, and a second deformation portion is provided on the second connection member;

in response to that a self-tapping screw is screwed into the second installation hole, the second deformation portion is squeezed to deform by the self-tapping screw, so as to limit the second connection member from being separated from the first installation hole; and a deformation direction of the first deformation portion is perpendicular to a deformation direction of the second deformation portion.

15. The vehicle ceiling according to claim 1, further comprising:

an air vent shell provided between the top metal plate and the roof panel assembly; and a plurality of connection buckles provided at one end of the air vent shell towards the top metal plate;

wherein the air vent shell is clamped on the top metal plate through the plurality of connection buckles.

16. The vehicle ceiling according to claim 15, wherein an air vent assembly is provided between the top metal plate and the roof panel assembly and is clamped on the top metal plate through the plurality of connection buckles;

the plurality of connection buckles are evenly distributed on one end of the air vent shell towards the top metal plate, and an installation hole corresponding to the connection buckle is provided on the top metal plate; and the connection buckle comprises a connection base, a first clamping piece and a second clamping piece, the connection base is fixedly connected to the air vent shell, and both the first clamping piece and the second clamping piece are provided with a protruding step cooperated with the installation hole.

17. The vehicle ceiling according to claim 15, wherein a hollowed area is provided at the roof panel assembly corresponding to the air vent shell, an air vent panel is provided between the air vent shell and the roof panel assembly and is configured to fix the air vent shell, the air vent panel is fixedly installed at an edge of the hollowed area, and an elastic sealing member is provided on one side of the air vent panel towards the air vent shell.

18. The vehicle ceiling according to claim 15, wherein the air vent shell comprises a first air vent pipe and a second air vent pipe, and an air inlet end of the first air vent pipe is communicated with an air inlet end of the second air vent pipe; and both the first air vent pipe and the second air vent pipe are provided with an air vent blade and an air vent motor configured for controlling a rotation of the air vent blade.

19. A vehicle, comprising the vehicle ceiling according to claim 1.

\* \* \* \* \*